US012720445B2

(12) United States Patent
Zhou et al.

(10) Patent No.: US 12,720,445 B2
(45) Date of Patent: Aug. 25, 2026

(54) TRANSMIT POWER ADJUSTMENT METHOD AND APPARATUS, AND SYSTEM

(71) Applicant: Huawei Technologies Co., Ltd., Shenzhen (CN)

(72) Inventors: Yipan Zhou, Shanghai (CN); Yi Sui, Shanghai (CN); Jianjun Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 366 days.

(21) Appl. No.: 18/290,874

(22) PCT Filed: Jul. 21, 2022

(86) PCT No.: PCT/CN2022/107195

§ 371 (c)(1),
(2) Date: Jan. 22, 2024

(87) PCT Pub. No.: WO2023/001255

PCT Pub. Date: Jan. 26, 2023

(65) Prior Publication Data

US 2025/0106785 A1 Mar. 27, 2025

(30) Foreign Application Priority Data

Jul. 23, 2021 (CN) ........................ 202110838502.1

(51) Int. Cl.
*H04W 52/36* (2009.01)
*H04B 7/0404* (2017.01)
*H04W 72/044* (2023.01)

(52) U.S. Cl.
CPC ........ *H04W 52/367* (2013.01); *H04B 7/0404* (2013.01); *H04W 72/0473* (2013.01)

(58) Field of Classification Search
CPC ............ H04W 52/367; H04W 72/0473; H04B 7/0404
See application file for complete search history.

(56) References Cited

U.S. PATENT DOCUMENTS 10,749,248 B1 8/2020 Malik et al.
10,812,125 B1 10/2020 Badic et al.
(Continued)

FOREIGN PATENT DOCUMENTS

CN 110289867 A 9/2019
CN 111479011 A 7/2020
(Continued)

*Primary Examiner* — Raymond S Dean
(74) *Attorney, Agent, or Firm* — Slater Matsil, LLP

(57) ABSTRACT

A transmit power adjustment method, apparatus, and a system. The system is configured for obtaining a first distance between a first antenna and a second antenna, determining a first transmit power of the first antenna, and a second transmit power of the second antenna, wherein, when the first distance is greater than a first value, the first transmit power is at or below a first limit power, and the second transmit power is at or below a second limit power, or wherein, when the first distance is less than the first value, a sum of a first exposure ratio of the first transmit power and a second exposure ratio of the second transmit power is less than or equal to 1, and transmitting, a signal at the first transmit power through the first antenna and a signal at the second transmit power through the second antenna.

20 Claims, 10 Drawing Sheets

(56) References Cited

U.S. PATENT DOCUMENTS

| | | | | |
|---|---|---|---|---|
| 2014/0221005 | A1* | 8/2014 | Marshall | G01S 5/021 455/456.1 |
| 2014/0315592 | A1 | 10/2014 | Schlub et al. | |
| 2016/0019785 | A1* | 1/2016 | Zhang | G01C 21/26 340/905 |
| 2020/0107274 | A1* | 4/2020 | Jadhav | H04W 52/367 |
| 2020/0374818 | A1* | 11/2020 | Cai | H04W 52/228 |
| 2020/0411960 | A1* | 12/2020 | Ng | H01Q 1/245 |
| 2021/0029644 | A1* | 1/2021 | Cho | H01Q 21/28 |

FOREIGN PATENT DOCUMENTS

| | | |
|---|---|---|
| CN | 112740769 A | 4/2021 |
| CN | 109219930 B | 5/2021 |
| CN | 112740767 B | 2/2023 |

* cited by examiner

TRANSMIT POWER ADJUSTMENT METHOD AND APPARATUS, AND SYSTEM

CROSS REFERENCE TO RELATED APPLICATIONS

This application is a national stage of International Application No. PCT/CN2022/107195, filed on Jul. 21, 2022, which claims priority to Chinese Patent Application No. 202110838502.1, filed on Jul. 23, 2021. Both of the aforementioned applications are hereby incorporated by reference in their entireties.

TECHNICAL FIELD

This application relates to the fields of terminals and communication technologies, and in particular, to a transmit power adjustment method and apparatus, and a system.

BACKGROUND

With development of information technologies, when enjoying various conveniences brought by electronic devices, a user is increasingly concerned about impact of electromagnetic radiation of the electronic devices on human health. In this field, electromagnetic radiation is usually measured by using indicators such as a specific absorption rate (SAR) and a maximum permissive exposure (MPE). For example, electromagnetic radiation may be reduced by reducing the SAR.

Usually, a person skilled in the art reduces electromagnetic radiation of the electronic device by reducing a transmit power of an antenna. However, reducing the transmit power of the antenna may degrade communication quality. Therefore, a balance between reducing the transmit power and ensuring the communication quality needs to be considered to control the transmit power.

A mobile phone is used as an example. Due to powerful functions, an existing mobile phone includes a plurality of antennas such as a wireless fidelity (Wi-Fi) antenna, a Bluetooth antenna, and a near field communication (NFC) antenna. Therefore, in a scenario in which the plurality of antennas simultaneously transmit signals, how to accurately control transmit powers of the antennas to ensure that the user is in a safe electromagnetic radiation range and the communication quality is not affected is an urgent problem to be resolved currently.

SUMMARY

This application provides a transmit power adjustment method and apparatus, and a system. According to the method, when a plurality of antennas simultaneously transmit signals, a transmit power of each antenna can be adjusted based on a location relationship between the antennas, to ensure that communication performance is improved as much as possible when a user is in a safe radiation range.

According to a first aspect, an embodiment of this application provides a transmit power adjustment method. An electronic device includes a first antenna and a second antenna. The method includes: The electronic device obtains a first distance between the first antenna and the second antenna. The electronic device determines whether the first distance is greater than a first value. The electronic device determines a first transmit power of the first antenna, and determines a second transmit power of the second antenna. When the first distance is greater than the first value, the first transmit power is less than or equal to a first limit power, and the second transmit power is less than or equal to a second limit power; the first limit power is a maximum transmit power that meets an electromagnetic radiation standard when the electronic device transmits a signal through only the first antenna; and the second limit power is a maximum transmit power that meets the electromagnetic radiation standard when the electronic device transmits a signal through only the second antenna. When the first distance is less than the first value, a sum of a first exposure ratio corresponding to the first transmit power and a second exposure ratio corresponding to the second transmit power is less than or equal to 1, the first exposure ratio is a ratio of the first transmit power to the first limit power, and the second exposure ratio is a ratio of the second transmit power to the second limit power. The electronic device transmits a signal at the first transmit power through the first antenna, and simultaneously, the electronic device transmits a signal at the second transmit power through the second antenna.

According to the method provided in the first aspect, the electronic device can determine, based on a location relationship between antennas, how to determine a transmit power of the antenna. When two antennas are far away from each other, the electronic device may not need to consider a superposition effect of radiation of the two antennas, but only needs to make transmit powers of the two antennas less than or equal to maximum transmit powers of the two antennas that meet the electromagnetic radiation standard. In this way, the electronic device can increase the transmit power of the antenna as much as possible while ensuring user safety, to ensure communication quality. When two antennas are close to each other, a superposition effect of radiation generated when the two antennas simultaneously transmit signals is obvious. The electronic device needs to consider the superposition effect of radiation of the two antennas. In this case, the electronic device needs to ensure that a sum of exposure ratios of the two antennas is less than or equal to 1, to ensure that radiation of the two antennas is still within a safe range. It can be learned that the electronic device can dynamically adjust the transmit powers of the antennas based on a distance between the antennas, to increase flexibility of power adjustment.

With reference to the first aspect, in a possible implementation, an average transmit power of the first antenna within a first time period is less than or equal to the first transmit power, and the first time period is less than or equal to a time period specified in the electromagnetic radiation standard.

In other words, the first transmit power may be a maximum transmit power of the first antenna determined by the electronic device, or may be a maximum average transmit power of the first antenna determined by the electronic device. When the first transmit power is the maximum average transmit power of the first antenna determined by the electronic device, an actual transmit power of the first antenna may be greater than the first transmit power or less than the first transmit power, provided that, within a period of time, namely, within the first time period, an average value of actual transmit powers does not exceed the first transmit power. In this way, the electronic device can dynamically adjust the transmit power of the antenna based on an actual signal transmission status of the antenna. When a signal of the antenna is weak, for example, the antenna is blocked, the electronic device can increase the transmit power of the antenna in short duration, to ensure the communication quality of the antenna.

With reference to the first aspect, in a possible implementation, an average transmit power of the second antenna within the first time period is less than or equal to the second transmit power, and the first time period is less than or equal to the time period specified in the electromagnetic radiation standard.

In other words, the second transmit power may be a maximum transmit power of the second antenna determined by the electronic device, or may be a maximum average transmit power of the second antenna determined by the electronic device. When the second transmit power is the maximum average transmit power of the second antenna determined by the electronic device, an actual transmit power of the second antenna may be greater than the second transmit power or less than the second transmit power, provided that, within a period of time, namely, within the first time period, an average value of actual transmit powers does not exceed the second transmit power. In this way, the electronic device can dynamically adjust the transmit power of the antenna based on an actual signal transmission status of the antenna. When a signal of the antenna is weak, for example, the antenna is blocked, the electronic device can increase the transmit power of the antenna in short duration, to ensure the communication quality of the antenna.

With reference to the first aspect, in a possible implementation, a transmit power of the second antenna is less than or equal to the second transmit power, or an average transmit power of the second antenna within the first time period is less than or equal to the second transmit power. The first time period is less than or equal to the time period specified in the electromagnetic radiation standard.

In other words, similarly to the first antenna, the second transmit power may be the maximum transmit power of the second antenna determined by the electronic device, or may be the maximum average transmit power of the second antenna determined by the electronic device. Similarly, when the second transmit power is the maximum average transmit power of the second antenna, the electronic device can dynamically adjust the transmit power of the antenna based on an actual signal transmission status of the antenna, to increase a degree of freedom of power adjustment.

With reference to the first aspect, in a possible implementation, the electronic device may make, by using a time average algorithm, the average transmit power of the first antenna within the first time period less than or equal to the first transmit power, and make, by using a time average algorithm, the average transmit power of the second antenna within the first time period less than or equal to the second transmit power.

With reference to the first aspect, in a possible implementation, the electronic device stores a first configuration table, the first configuration table includes the first transmit power and the second transmit power, and when the first distance is greater than the first value, that the electronic device determines the first transmit power of the first antenna, and determines the second transmit power of the second antenna specifically includes: The electronic device determines, based on the first configuration table, the first transmit power of the first antenna, and determines the second transmit power of the second antenna.

In other words, the electronic device may store a single-antenna power configuration table or a limit transmit power configuration table. The single-antenna power configuration table pre-stores a maximum transmit power of an antenna when the antenna transmits a signal independently, namely, a reference transmit power $P_R$. The limit transmit power configuration table pre-stores a maximum transmit power of the antenna that meets a regulatory requirement, namely, a limit transmit power $P_L$. In this way, in a multi-antenna transmission scenario, the electronic device does not need to store transmit powers of antennas when different antenna combinations transmit signals in the multi-antenna transmission scenario, and the electronic device only needs to store the transmit powers of the antennas in a single-antenna transmission scenario, to reduce transmit power configuration word in the multi-antenna transmission scenario and reduce memory occupied by a system.

With reference to the first aspect, in a possible implementation, the electronic device stores a second configuration table, the second configuration table includes a first reference exposure ratio and a second reference exposure ratio, and when the first distance is greater than the first value, that the electronic device determines the first transmit power of the first antenna, and determines the second transmit power of the second antenna specifically includes:

The electronic device determines the first transmit power of the first antenna based on the first reference exposure ratio, and determines the second transmit power of the second antenna based on the second reference exposure ratio, where the first transmit power is a product of the first limit power and the first reference exposure ratio, and the second transmit power is a product of the second limit power and the second reference exposure ratio.

In other words, the electronic device can pre-store a reference exposure ratio configuration table, and determine the transmit powers of the first antenna and the second antenna based on the reference exposure ratios in the reference exposure ratio configuration table.

With reference to the first aspect, in a possible implementation, when the first distance is less than the first value, that the electronic device determines the first transmit power of the first antenna, and determines the second transmit power of the second antenna specifically includes: The electronic device determines the first exposure ratio and the second exposure ratio according to an exposure ratio allocation method, where the exposure ratio allocation method includes one or more of the following: even allocation, preferential allocation, allocation based on a service type, allocation based on signal strength, or allocation based on a ratio of exposure ratios; and the electronic device determines the first transmit power of the first antenna based on the first exposure ratio, and determines the second transmit power of the second antenna based on the second exposure ratio.

When the antennas are close to each other, the electronic device may adjust the exposure ratios of the antennas, to reduce the superposition effect of radiation when the two antennas transmit signals, to ensure that the user is in a safe radiation range.

With reference to the first aspect, in a possible implementation, the electronic device presets a total exposure ratio of the first antenna and the second antenna, and the total exposure ratio is a sum of the first exposure ratio and the second exposure ratio.

In other words, before the electronic device adjusts the transmit powers of the antennas, the electronic device may preset the total exposure ratio of the antennas. The electronic device may allocate an exposure ratio of each antenna based on the preset total exposure ratio, to further calculate the transmit power of each antenna.

With reference to the first aspect, in a possible implementation, when the first distance is less than the first value, that the electronic device determines the first transmit power of the first antenna, and determines the second transmit power of the second antenna specifically includes: The electronic device obtains the first reference exposure ratio and the second reference exposure ratio, where the first reference exposure ratio is a ratio of a first reference power to the first limit power, and the second reference exposure ratio is a ratio of a second reference power to the second limit power; and the first reference power is less than or equal to the first limit power, and the second reference power is less than or equal to the second limit power; and when a sum of the first reference exposure ratio and the second reference exposure ratio is less than or equal to 1, the electronic device determines the first reference power as the first transmit power, and the electronic device determines the second reference power as the second transmit power.

In other words, when the transmit powers of the antennas are preset in the electronic device, and a sum of exposure ratios corresponding to the preset transmit powers of the antennas is less than or equal to 1, it indicates that when the antenna transmits a signal at the preset transmit power, superposed radiation of the antennas is still in the safe radiation range. In this case, the electronic device can directly transmit a signal at a threshold transmit power, to reduce a calculation amount of the electronic device and accelerate a power adjustment process of the antenna.

With reference to the first aspect, in a possible implementation, the electronic device stores the first reference power, the second reference power, the first reference exposure ratio, and the second reference exposure ratio; or the electronic device stores the first reference power, the second reference power, the first limit power, and the second limit power; or the electronic device stores the first reference exposure ratio, the second reference exposure ratio, the first limit power, and the second limit power.

In other words, to determine the transmit power of the antenna with reference to the exposure ratio, the electronic device may preset any two of the single-antenna power configuration table, the limit transmit power configuration table, and the reference exposure ratio configuration table. In this way, the electronic device can obtain the transmit power of the antenna through calculation based on the preset configuration tables.

With reference to the first aspect, in a possible implementation, the electronic device pre-stores an antenna location relationship table, and the antenna location relationship table is for determining a distance between the first antenna and the second antenna; and that the electronic device obtains the first distance between the first antenna and the second antenna specifically includes: The electronic device obtains the first distance between the first antenna and the second antenna based on the antenna location relationship table.

In other words, the electronic device may preset the antenna location relationship table. In this way, the electronic device can determine, based on the location relationship between the antennas in the antenna location relationship table, a distance between the antennas in the multi-antenna transmission scenario, to determine a method that can be used for these antennas to adjust the transmit powers.

According to a second aspect, an embodiment of this application provides an electronic device. The electronic device includes: an identification module, an adjustment module, and a calculation module. The identification module obtains a first distance between a first antenna and a second antenna. The adjustment module determines whether the first distance is greater than a first value. The calculation module determines a first transmit power of the first antenna, and determines a second transmit power of the second antenna. When the first distance is greater than the first value, the first transmit power is less than or equal to a first limit power, and the second transmit power is less than or equal to a second limit power; the first limit power is a maximum transmit power that meets an electromagnetic radiation standard when the electronic device transmits a signal through only the first antenna; and the second limit power is a maximum transmit power that meets the electromagnetic radiation standard when the electronic device transmits a signal through only the second antenna. When the first distance is less than the first value, a sum of a first exposure ratio corresponding to the first transmit power and a second exposure ratio corresponding to the second transmit power is less than or equal to 1, the first exposure ratio is a ratio of the first transmit power to the first limit power, and the second exposure ratio is a ratio of the second transmit power to the second limit power. A transmit module transmits a signal at the first transmit power through the first antenna, and simultaneously, the electronic device transmits a signal at the second transmit power through the second antenna.

With reference to the second aspect, in a possible implementation, a transmit power of the first antenna is less than or equal to the first transmit power, or an average transmit power of the first antenna within the first time period is less than or equal to the first transmit power. The first time period is less than or equal to a time period specified in the electromagnetic radiation standard.

With reference to the second aspect, in a possible implementation, a transmit power of the second antenna is less than or equal to the second transmit power, or an average transmit power of the second antenna within the first time period is less than or equal to the second transmit power. The first time period is less than or equal to the time period specified in the electromagnetic radiation standard.

With reference to the second aspect, in a possible implementation, a storage module stores a first configuration table, the first configuration table includes the first transmit power and the second transmit power, and when the first distance is greater than the first value, the adjustment module determines, based on the first configuration table, the first transmit power of the first antenna, and determines the second transmit power of the second antenna.

With reference to the second aspect, in a possible implementation, the electronic device stores a second configuration table, the second configuration table includes the first reference exposure ratio and the second reference exposure ratio, and when the first distance is greater than the first value, the adjustment module determines the first transmit power of the first antenna based on the first reference exposure ratio, and determines the second transmit power of the second antenna based on the second reference exposure ratio, where the first transmit power is a product of the first limit power and the first reference exposure ratio, and the second transmit power is a product of the second limit power and the second reference exposure ratio.

With reference to the second aspect, in a possible implementation, when the first distance is less than the first value, the adjustment module determines the first exposure ratio and the second exposure ratio according to an exposure ratio allocation method, where the exposure ratio allocation method includes one or more of the following: even allocation, preferential allocation, allocation based on a service type, allocation based on signal strength, or allocation based on a ratio of exposure ratios; and the adjustment module determines the first transmit power of the first antenna based on the first exposure ratio, and determines the second transmit power of the second antenna based on the second exposure ratio.

With reference to the second aspect, in a possible implementation, the storage module presets a total exposure ratio of the first antenna and the second antenna, and the total exposure ratio is a sum of the first exposure ratio and the second exposure ratio.

With reference to the second aspect, in a possible implementation, when the first distance is less than the first value, the adjustment module obtains the first reference exposure ratio and the second reference exposure ratio, where the first reference exposure ratio is a ratio of a first reference power to the first limit power, and the second reference exposure ratio is a ratio of a second reference power to the second limit power; and the first reference power is less than or equal to the first limit power, and the second reference power is less than or equal to the second limit power; and when a sum of the first reference exposure ratio and the second reference exposure ratio is less than or equal to 1, the adjustment module determines the first reference power as the first transmit power, and the electronic device determines the second reference power as the second transmit power.

With reference to the second aspect, in a possible implementation, the storage module stores the first reference power, the second reference power, the first reference exposure ratio, and the second reference exposure ratio; or the electronic device stores the first reference power, the second reference power, the first limit power, and the second limit power; or the electronic device stores the first reference exposure ratio, the second reference exposure ratio, the first limit power, and the second limit power.

With reference to the second aspect, in a possible implementation, the storage module pre-stores an antenna location relationship table, and the antenna location relationship table is for determining a distance between the first antenna and the second antenna; and the identification module obtains the first distance between the first antenna and the second antenna based on the antenna location relationship table.

According to a third aspect, an embodiment of this application provides an electronic device, including a display, a memory, one or more processors, a plurality of applications, and one or more programs. The one or more programs are stored in the memory. When the one or more processors execute the one or more programs, the electronic device is enabled to implement the method according to any one of the first aspect or the implementations of the first aspect.

According to a fourth aspect, an embodiment of this application provides a computer-readable storage medium. The computer-readable storage medium includes instructions. When the instructions are run on an electronic device, the electronic device is enabled to perform the method according to any one of the first aspect or the implementations of the first aspect.

According to a fifth aspect, an embodiment of this application provides a computer program product, and when the computer program product runs on a computer, the computer is enabled to perform the method according to any one of the first aspect or the implementations of the first aspect.

DETAILED DESCRIPTION OF ILLUSTRATIVE EMBODIMENTS

Figure 1:
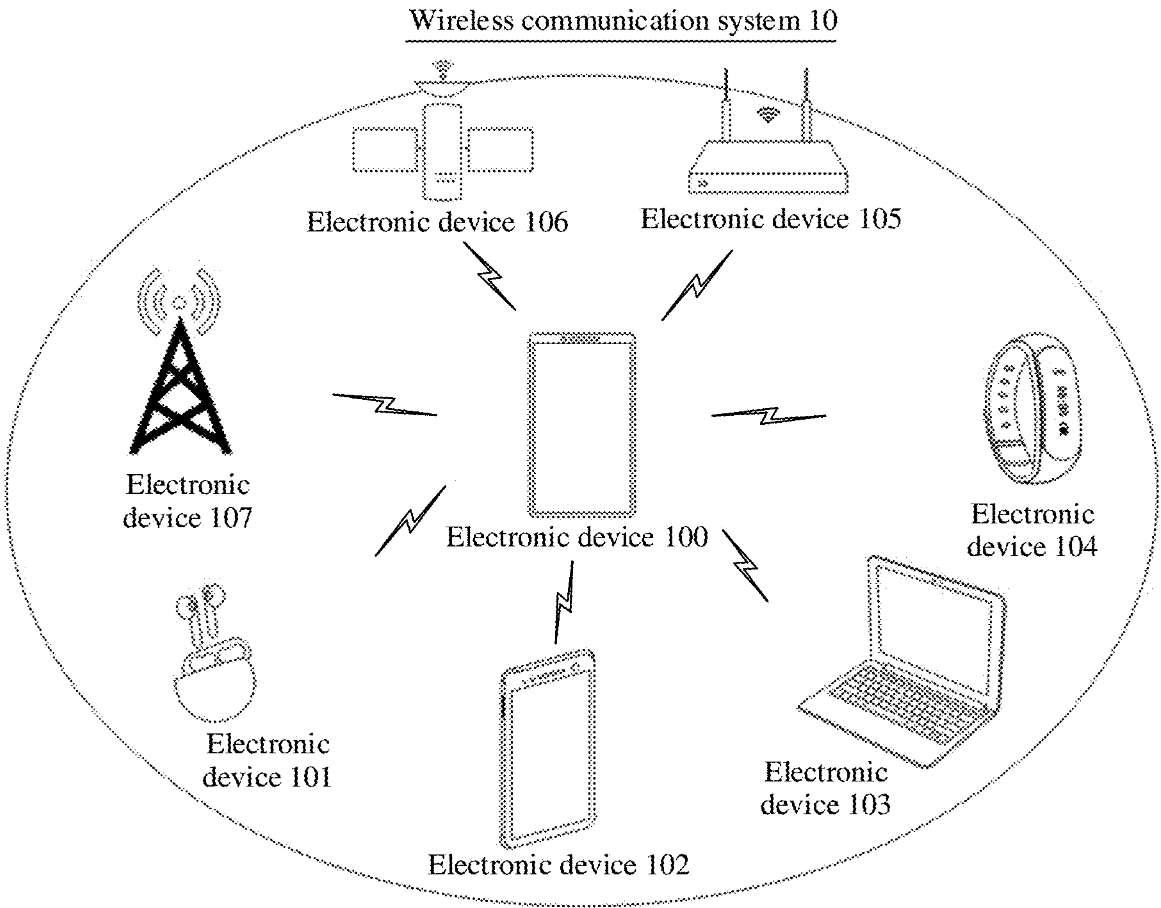
FIG. 1 is a schematic diagram of a wireless communication system 10 according to an embodiment of this application.

The following describes the technical solutions in embodiments of this application with reference to the accompanying drawings. In descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

For ease of understanding, the following first describes related terms and concepts that are used in embodiments of this application.

When accessing a network, electronic devices such as a mobile phone and a tablet need comply with local laws and regulations. For example, products need to pass the China Compulsory Certification (China Compulsory Certification, CCC) when accessing the network in China, products need to pass the Conformite Europeenne (Conformite Europeenne, CE) certification when entering the European market, and products need to pass the Federal Communication Commission (Federal Communication Commission, FCC) certification when entering the USA market.

(1) Specific Absorption Rate (Specific Absorption Rate, SAR)

The SAR is a standard measure and is for measuring an absorption of electromagnetic energy generated by an electronic device like a mobile phone by human tissue. A unit of the SAR is W/Kg (watt/kilogram). A larger SAR indicates greater impact of electromagnetic radiation on a user, and a smaller SAR indicates smaller impact. Currently, some regulatory institutes have set up electromagnetic energy absorption specifications and set SAR limit values. The SAR limit value is a maximum amount of electromagnetic energy permitted to be absorbed per kilogram of human tissue within 6 minutes. For example, the Federal Communication Commission (Federal Communication Commission, FCC) has set an SAR limit value to 1.6 W/Kg, and the European Telecommunications Standard Institute (European Telecommunications Standard Institute, ESTI) has set an SAR limit value to 2.0 W/Kg.

(2) Maximum Permissive Exposure (Maximum Permissive Exposure, MPE)

Similar to the SAR, the MPE also indicates impact of electromagnetic energy generated by an electronic device like a mobile phone on a human body. A unit of the MPE is W/m2 (watt/square meter). Generally, a measured value of the MPE is a power density (Power Density, PD), namely, electromagnetic energy absorbed by the human body per unit area.

Both SAR and MPE are for measuring, by using a device, electromagnetic energy absorbed by a human body model, and are radiation indicators that measure radiation impact of an electronic device on the human body. The SAR may be for measuring impact of low frequency (a frequency less than 6 GHz) radiation on the human body, and the MPE may be for measuring impact of high frequency (a frequency greater than 6 GHz) radiation on the human body.

(3) Total Exposure Ratio (Total Exposure Ratio, TER)

As a communication system is increasingly complex, an electronic device includes more antennas. In an SAR test, all transmit antennas and all possible antenna combinations included in a terminal device are required to be tested. When a single antenna transmits a signal or a plurality of antennas transmit signals simultaneously, a regulatory requirement needs to be met. When the plurality of antennas transmit signals, a total exposure ratio is measured by the TER.

The TER may be for measuring impact of electromagnetic radiation of the electronic device on a human body when the plurality of antennas simultaneously transmit signals. The TER may be determined based on the foregoing radiation indicator. The TER may be indicated according to Formula 1:

$$TER=\sum_{n=1}^{N}\frac{SAR_n}{SAR_{n,limit}}+\sum_{m=1}^{M}\frac{PD_m}{PD_{m,limit}} \quad \text{Formula 1}$$

$SAR_n$ indicates a measured SAR value of the antenna when an $n^{th}$ antenna transmitting a low frequency signal operates, and $SAR_{n,limit}$ indicates an SAR limit value of the $n^{th}$ antenna transmitting a low frequency signal. Herein, n=1, 2, . . . , N, where N indicates a quantity of antennas transmitting a low frequency (a frequency less than 6 GHz) signal. $PD_m$ indicates a measured PD value of an antenna when an $m^{th}$ antenna transmitting a high frequency signal operates, and $PD_{m,limit}$ indicates a PD limit value of the $m^{th}$ antenna transmitting a high frequency signal. Herein, n=1, 2, . . . , M, where M indicates a quantity of antennas transmitting a high frequency (a frequency greater than 6 GHz) signal.

It can be learned that the total exposure ratio is a sum of exposure ratios of all antennas that transmit signals. When the plurality of antennas simultaneously transmit signals, and TER≤1, the impact of electromagnetic energy generated by the electronic device on the human body is within a safe range.

It should be noted that the SAR and the MPE are for measuring electromagnetic radiation generated by antennas in different frequency bands (the SAR describes impact of low frequency (a frequency usually less than 6 GHZ) radiation on the human body, and the MPE generally describes impact of high frequency (a frequency greater than 6 GHz) radiation on the human body), and the total exposure ratio may alternatively be indicated as $$TER=\sum_{n=1}^{N}\frac{SAR_n}{SAR_{n,limit}},\text{ or } TER=\sum_{m=1}^{M}\frac{PD_m}{PD_{m,limit}}.$$

(4) Time Average Algorithm

The time average algorithm may be for controlling an average transmit power of an electronic device within a period of time to be kept at or less than a fixed value. The fixed value may be a limit transmit power determined based on a regulatory limit value of a radiation indicator.

Electromagnetic energy measured by using an SAR is absorbed by a human body within a period of time. Therefore, in a regulation, the time average algorithm is permitted to be used to calculate an average SAR value within a period of time, and the average SAR value does not exceed an SAR limit value. When the electronic device transmits a signal through a single antenna, whether a transmit power of the electronic device meets a regulatory requirement may be measured according to Formula 2:

$$\frac{\frac{1}{T_{SAR}}\int_{t-T_{SAR}}^{t}SAR(t)dt}{SAR_{limit}}\leq 1 \quad \text{Formula 2}$$

SAR(t) indicates an instantaneous value of the SAR, TSAR indicates maximum average duration permitted by the regulation, and $SAR_{limit}$ indicates the SAR limit value in the regulation. In other words, if a measured average SAR value is less than the SAR limit value in a period of time during which the electronic device transmits a signal, the transmit power of the electronic device meets the regulatory requirement.

Similarly to the MPE, when the electronic device transmits a signal through the single antenna, an average MPE value in a period of time may be calculated by using the time average algorithm. Specifically, whether the transmit power of the electronic device meets the regulatory requirement may be measured according to Formula 3:

$$\frac{\frac{1}{T_{PD}}\int_{t-T_{PD}}^{t}PD(t)dt}{PD_{limit}}\leq 1 \quad \text{Formula 3}$$

In addition, when the electronic device transmits a signal through a plurality of antennas, and an operating frequency of the antenna includes a high frequency (the frequency greater than 6 GHz) and a low frequency (the frequency usually less than 6 GHZ), whether the transmit power of the electronic device meets the regulatory requirement may be measured according to Formula 4:

Formula 4

$$TER = \frac{\frac{1}{T_{SAR}}\left[\int_{t-T_{SAR}}^{t} SAR_1(t)dt + \int_{t-T_{SAR}}^{t} SAR_2(t)dt + \dots + \int_{t-T_{SAR}}^{t} SAR_N(t)dt\right]}{(SAR\text{ limit})} + \frac{\frac{1}{T_{PD}}\left[\int_{t-T_{PD}}^{t} PD_1(t)dt + \int_{t-T_{PD}}^{t} PD_2(t)dt + \dots + \int_{t-T_{PD}}^{t} PD_M(t)dt\right]}{PD\text{ limit}} \leq 1$$

It can be learned that, when a sum of average radiation indicator values of the plurality of antennas in a period of time is less than or equal to a regulatory limit value of the radiation indicator, the transmit power of the electronic device meets the regulatory requirement.

FIG. 1 shows a wireless communication system 10 in this application.

FIG. 1 shows an example of the wireless communication system 10 according to an embodiment of this application. The wireless communication system 10 may include a plurality of wireless communication devices. A wireless communication connection is established between the plurality of devices. An Android® system, a Windows® system, an iOS® system, a macOS® system, a Linux® system, a HarmonyOS® (HarmonyOS, HOS), or another type of operating system may be run on a device in the wireless communication system 10. Operating systems of devices in the wireless communication system 10 may be the same or may be different. This is not limited in this application. As shown in FIG. 1, in some embodiments, the wireless communication system 10 includes electronic devices 100 to 107.

The electronic device 100 is a device for sending a radio signal, and the electronic devices 101 to 107 are devices for receiving a radio signal.

The electronic device 100 may be a terminal device that directly provides a communication service for a user, for example, a device like a mobile phone, a computer, a notebook computer, or a wireless headset. The communication service may include a call service, a download service, a device connection service, and the like. The electronic devices 101 to 107 may be electronic devices that establish wireless communication connections to the electronic device 100, for example, a mobile phone, a computer, a notebook computer, a smartwatch, a smart band, smart glasses, a router, a satellite, and a base station. The wireless communication connection may be a Wi-Fi connection, an NFC connection, a Bluetooth connection, or the like. In the following embodiments, the terminal device may also be referred to as a terminal for short. The terminal device is usually an intelligent electronic device that can provide a user interface, interact with a user, and provide a service function for the user.

Correspondingly, to implement communication between the electronic device 100 and the electronic devices 101 to 107, mobile communication modules and wireless communication modules may be configured in the electronic devices 100 to 107 for communication. The mobile communication module may provide a wireless communication solution that is applied to the terminal and that includes the 2nd generation mobile communication technology (the 2nd generation mobile communication technology, 2G), the 3rd generation mobile communication technology (the 3rd generation mobile communication technology, 3G), the 4th generation mobile communication technology (the 4th generation mobile communication technology, 4G), the 5th generation mobile communication technology (the 5th generation mobile communication technology, 5G), or the like. The wireless communication module may include a Bluetooth (Bluetooth, BT) module, a wireless local area network (wireless local area network, WLAN) module, and/or the like. The Bluetooth module can provide a Bluetooth communication solution including one or more of classic Bluetooth (Bluetooth 2.1) and Bluetooth low energy (Bluetooth low energy, BLE). The WLAN module can provide a WLAN communication solution including one or more of a wireless fidelity peer-to-peer connection (wireless fidelity peer-to-peer, Wi-Fi P2P), a wireless fidelity local area network (wireless fidelity local area network, Wi-Fi LAN), and a wireless fidelity software access point (wireless fidelity software access point, Wi-Fi softAP). In some embodiments, the Wi-Fi P2P means that devices in a wireless network can be connected to each other in a peer-to-peer manner without a need to use a wireless router, and may also be referred to as wireless fidelity direct (wireless fidelity direct, Wi-Fi direct) in the Android® system. Devices that establish a Wi-Fi P2P connection can exchange data (such as a file, an image, and a video) over Wi-Fi (need to be in a same frequency band) without connecting to a network or hotspot. Compared with that of Bluetooth, the Wi-Fi P2P has advantages such as a faster search speed, a faster transmission speed, and a longer transmission distance.

In a process in which the electronic device 100 provides the communication service for the user, the electronic device 100 needs to send a signal to another device through an antenna. In this case, electromagnetic energy generated by the antenna may affect the user who is close to or in contact with the electronic device 100, and further affect human health.

In addition, the electronic device 100 may simultaneously enable a plurality of antennas, to send a signal to a plurality of electronic devices in the electronic devices 101 to 107. For example, when the electronic device 100 establishes a Wi-Fi connection to the electronic device 103 by using a Wi-Fi technology, the electronic device 100 enables the Bluetooth to establish a Bluetooth connection to the electronic device 104. In this case, the electronic device 100 needs to enable the plurality of antennas (a Wi-Fi antenna and a Bluetooth antenna) to simultaneously transmit signals. In this embodiment of this application, a scenario in which the electronic device 100 enables the plurality of antennas to simultaneously transmit signals is referred to as a multi-antenna transmission scenario.

In this case, in the wireless communication system 10, when the electronic device 100 enables the plurality of antennas to transmit the signal, the electronic device 100 needs to control transmit powers of the plurality of antennas, to ensure that the user is in a safe radiation range.

It should be noted that the wireless communication system 10 shown in FIG. 1 is merely for assisting in describing the technical solutions provided in embodiments of this application, and does not constitute a limitation on embodiments of this application. In an actual service scenario, the wireless communication system 10 may include more or fewer electronic devices. A type of an electronic device, a quantity of electronic devices, a connection manner between electronic devices, and the like are not limited in this application.

In the multi-antenna transmission scenario, to ensure that electromagnetic radiation generated by the electronic device 100 when the electronic device 100 transmits a signal is within the safe radiation range, the electronic device 100 needs to limit a transmit power of each antenna, to ensure that the transmit power meets a related regulatory requirement. In a specific implementation, the transmit power of each antenna may be limited to be less than a transmit power corresponding to a radiation indicator specified in a related regulation. For example, the radiation indicator may be an SAR, or an MPE.

In an implementation, the electronic device 100 may be configured with a multi-antenna power configuration table. Before the electronic device 100 transmits a signal, the electronic device 100 may adjust the transmit power based on a power value in the multi-antenna power configuration table, to ensure that the transmit power of the electronic device 100 does not exceed the power value.

The multi-antenna power configuration table indicates the power value of the electronic device 100 in different antennas and different scenarios. The power value is a permissive maximum transmit power of the electronic device 100, and the transmit power is less than or equal to the power value in the regulatory requirement. In other words, user safety can be ensured provided that the electronic device 100 determines antennas that transmit signals and enables transmit powers of these antennas not to exceed power values in the multi-antenna power configuration table.

Table 1 shows an example of the multi-antenna power configuration table configured in the electronic device 100 in the multi-antenna scenario.

TABLE 1

| | Antenna X + Antenna Y | | Antenna X + Antenna Y + Antenna Z | | | . . . |
|---|---|---|---|---|---|---|
| | Antenna X | Antenna Y | Antenna X | Antenna Y | Antenna Z | . . . |
| Scenario 1 | Power1X | Power1Y | Power1X | Power1Y | Power1Z | . . . |
| Scenario 2 | Power2X | Power2Y | Power2X | Power2Y | Power2Z | . . . |
| . . . | . . . | . . . | . . . | . . . | . . . | . . . |
| Scenario M | PowerMX | PowerMY | PowerMX | PowerMY | PowerMZ | . . . |

The scenario 1, the scenario 2, . . . , and the scenario M may indicate scenarios in which the electronic device 100 transmits a signal when the electronic device 100 is close to different parts of the human body. The antennas X, Y, and Z may be antennas included in the electronic device 100. The power value in the multi-power configuration table may be obtained by calculating by the electronic device 100 based on a transmit power that meets the regulatory requirement when each antenna separately transmits a signal and with reference to TER≤1, or may be obtained through a simulation test, or may be obtained through a test in an actual test scenario.

In other words, the electronic device 100 is usually configured with two configuration tables: a single-antenna power configuration table and a multi-antenna power configuration table.

The single-antenna power configuration table includes the transmit power that meets the regulatory requirement when each antenna separately transmits a signal, namely, a reference transmit power $P_R$. The single-antenna power configuration table includes reference transmit powers $P_R$ of the electronic device 100 in different radiation indicator test scenarios of different antennas in a single-antenna transmission scenario. The reference transmit power $P_R$ is the permissive maximum transmit power of the electronic device 100, and the reference transmit power $P_R$ is less than or equal to a limit transmit power $P_L$ in the regulatory requirement. The single-antenna transmission scenario is a scenario in which the electronic device 100 transmits a signal through one antenna. It should be understood that the limit transmit power $P_L$ is one of transmit powers that meet the regulatory requirement in different radiation indicator test scenarios of different antennas in the single-antenna transmit scenario.

To obtain the single-antenna power configuration table of the electronic device 100, the electronic device 100 needs to be placed in a radiation indicator test environment for testing, to determine the reference transmit power $P_R$ of each antenna in the single-antenna power configuration table.

Table 2 shows an example of the single-antenna power configuration table configured in the electronic device 100 in the single-antenna scenario when the electronic device 100 is placed in an SAR test environment for testing.

TABLE 2

| | Antenna 1 | Antenna 2 | . . . | Antenna N |
|---|---|---|---|---|
| Scenario 1 | $P_R$11 | $P_R$12 | . . . | $P_R$1N |
| Scenario 2 | $P_R$21 | $P_R$22 | . . . | $P_R$2N |
| . . . | . . . | . . . | . . . | . . . |
| Scenario M | $P_R$M1 | $P_R$M2 | . . . | $P_R$MN |

Herein, N indicates a quantity of antennas of the electronic device 100, and M indicates a quantity of SAR test scenarios. Because radiation values that can be received by a user head, torso, and limbs are different, in the SAR specification, different SAR limit values exist for different parts of the user. Therefore, the SAR test scenarios may include test scenarios in which the electronic device 100 is close to different human body parts. For example, the scenario 1 may indicate a scenario in which the SAR is tested when the electronic device 100 is close to the user head, and the scenario 2 may indicate a scenario in which the SAR is tested when the electronic device 100 is close to the user torso. $P_R$XY (X=1, 2, . . . , M, Y=1, 2, . . . , N) indicates a reference transmit power $P_R$ of the antenna X permitted when the electronic device 100 transmits a signal through the antenna X in a scenario Y.

In an actual SAR test process, the electronic device 100 may be placed close to a human body model, and whether the transmit power of the electronic device 100 meets the SAR specification is determined by measuring an SAR value of the human body model. Specifically, a chemical liquid may be used as a measured liquid to simulate a human tissue liquid. For example, when the measured liquid is placed in a human body head model, and the electronic device 100 is placed close to the human body head model. This may be used to simulate a test scenario in which the electronic device 100 is close to the user head. Then, when the electronic device 100 transmits a signal through an antenna, a probe is used to scan the measured liquid, and an SAR value of the measured liquid is measured by using the probe, to determine whether a transmit power of the antenna complies with the SAR specification. In the test process, because the transmit power is in direct proportion to the SAR value, whether the transmit power used in the test process meets the regulatory requirement may be determined by adjusting the transmit power and with reference to an SAR test result, to obtain each reference transmit power $P_R$ in Table 2.

Figure 2:
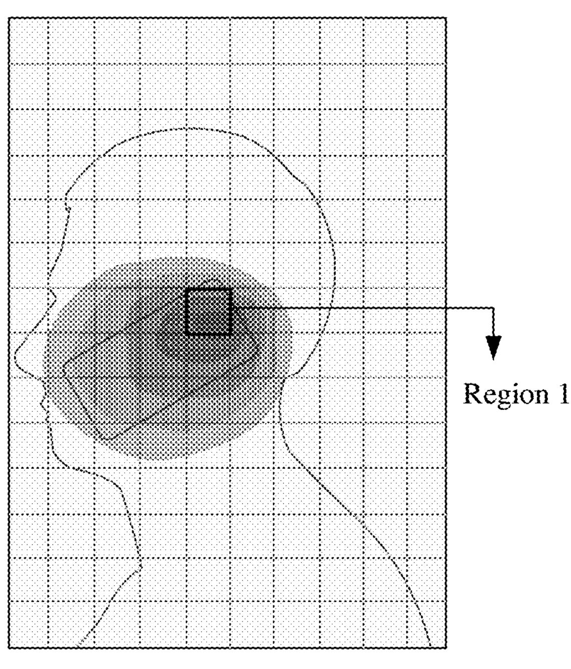
FIG. 2 is a distribution diagram of SARs measured in an SAR test process according to an embodiment of this application.

FIG. 2 is an example of an SAR distribution diagram of a test result generated when the electronic device 100 is close to the user head, and the electronic device 100 enables the antenna 1 and transmits a signal at the transmit power whose power value is $P_R$11. It can be learned from FIG. 2 that, a deeper color region indicates a larger SAR value and larger radiation of the region. An SAR value in a region 1 is the largest. If the SAR value does not exceed the SAR specification, that in the scenario in which the electronic device 100 is close to the user head, the antenna 1 of the electronic device 100 transmits a signal at the transmit power whose power value is $P_R$11 meets the SAR regulatory requirement.

The multi-antenna power configuration table is obtained through manual configuration based on the single-antenna power configuration table. Generally, to obtain the transmit power of each antenna in the multi-antenna power configuration table, a back-off power needs to be manually introduced based on the transmit power of the antenna described in the single-antenna configuration table, so that when the plurality of antennas transmit powers simultaneously, it is ensured that the user is still in a safe radiation range when radiation of all antennas is superposed. Herein, a transmit power of an antenna in the multi-antenna power configuration table is the transmit power of the antenna in the single-antenna power configuration table minus the back-off power. For example, Power1X may be obtained by subtracting a first back-off power from $P_R$11, and Power1Y may be obtained by subtracting a second back-off power from $P_R$12, where the first back-off power may be equal to or may not be equal to the second back-off power.

It can be learned that, when the electronic device 100 transmits a signal through the antenna X and the antenna Y, power values of the antenna X and the antenna Y in different scenarios (for example, the scenario in which the antenna is close to the head and a scenario in which the antenna is close to the body) in this case need to be listed. When the electronic device 100 transmits a signal through the antenna X, the antenna Y, and the antenna Z power values of the antenna X, the antenna Y, and the antenna Z in different scenarios in this case need to be listed. By analogy, when the electronic device 100 includes the antennas X, Y, and Z, a case in which two antennas are concurrent includes: The antennas X and Y are concurrent, the antennas X and Z are concurrent, and the antennas Y and Z are concurrent; and a case in which three antennas are concurrent includes: The antennas X, Y, and Z are concurrent. In other words, if the electronic device includes three antennas, Table 1 should include transmit power of each antenna in the four antenna combinations in different scenarios.

In other words, Table 1 needs to include a transmit power of each antenna in various antenna combinations in different scenarios, to ensure that in an actual signal transmission process, various possible cases are included in the multi-antenna power configuration table. Therefore, when the electronic device 100 has a large quantity of antennas, a structure of the multi-antenna power configuration table may be complex. This increases a configuration workload of configuration personnel, and easily causes a configuration error. The multi-antenna configuration table also occupies large memory.

In addition, in the multi-antenna power configuration table, impact of a location relationship between the plurality of antennas on radiation is not considered. In an actual case, when the plurality of antennas are far away from each other, a superposition degree of electromagnetic radiation generated by the plurality of antennas is small, and a superposition effect is weak. Therefore, transmit powers of the plurality of antennas may not need to be calculated with reference to TER≤1. Only when the plurality of antennas are close to each other, the superposition degree of electromagnetic radiation generated by the plurality of antennas is large, and it may be considered that radiation of the plurality of antennas is superposed. However, in the multi-antenna power configuration table, the transmit power values are simply configured for the plurality of antennas by introducing back-off powers when the plurality of antennas are close to each other. Consequently, good communication performance cannot be ensured. Communication quality may be degraded due to introduction of the back-off power, for example, a phenomenon like signal freezing may occur, and consequently, good communication performance cannot be ensured.

An embodiment of this application provides a transmit power adjustment method in a multi-antenna transmission scenario. The method is applied to an electronic device configured with a plurality of antennas. Specifically, an exposure ratio is allocated to the transmit antenna by determining a location relationship of the transmit antennas and according to an exposure ratio allocation method.

In a process of transmitting signals through the plurality of antennas, the electronic device 100 may first obtain a location relationship between the plurality of antennas, and select different exposure ratio allocation policies based on the location relationship to configure exposure ratios of the plurality of antennas. The exposure ratio allocation method may include but is not limited to the following plurality of manners: evenly allocating an exposure ratio to the antennas, allocating an exposure ratio based on a specific proportion coefficient, and the like. Alternatively, the electronic device may preferentially allocate an exposure ratio based on a service type, and/or allocate an exposure ratio based on signal strength.

For example, in a dual-antenna radiation scenario, a location relationship between an antenna 1 and an antenna 2 that transmit signals simultaneously is a distance level 1 (for example, a short distance). It is considered that a superposition degree of radiation of the two antennas at the distance level 1 is large, and an exposure ratio allocation method 1 is selected to calculate transmit powers of the two antennas. The exposure ratio allocation method 1 may be evenly allocating an exposure ratio to the antennas or allocating an exposure ratio based on a coefficient. If the location relationship between the antenna 1 and the antenna 2 that transmit the signals simultaneously is a distance level 2 (for example, a long distance), the antenna 1 and the antenna 2 may be configured based on a single-antenna exposure ratio.

The electronic device pre-determines a location relationship between antennas in a multi-antenna radiation state, and configures, by using different exposure ratio allocation policies, transmit powers for dual antennas that transmit the signal. This can avoid manually configuring transmit powers of the antennas in the dual-antenna radiation scenario, and can ensure the communication quality while ensuring that a radiation indicator does not exceed a regulatory value.

The electronic device can allocate an exposure ratio based on the antenna signal strength, the service type, and the different exposure ratio allocation policies. This can ensure the communication quality. For example, for antennas that are close to each other, for an antenna 1 in a data service, a larger proportion exposure ratio may be set; or for an antenna 1 has a strong antenna signal, a larger proportion exposure ratio may be set.

Further, after the electronic device 100 obtains the transmit powers of the antennas, the electronic device 100 may set the obtained transmit powers to average powers of the antennas by using a time average algorithm. In the actual signal transmission process, the electronic device 100 may make the average value of the transmit powers within a period of time less than or equal to the average power. In other words, instantaneous power values of the antennas at different moments may be calculated by using the time average algorithm.

An embodiment of this application further provides a transmit power adjustment method. The method is applied to an electronic device configured with a plurality of antennas. For antennas that are far away from each other, the exposure ratio allocation method is not used. Instead, the exposure ratio allocation method is used for the antennas that are close to each other.

In the transmit power adjustment method provided in embodiments of this application, in a process of transmitting signals through the plurality of antennas, or before transmitting signals through the plurality of antennas, the electronic device 100 may first obtain a location relationship between the plurality of antennas, and select different policies for different antennas based on the location relationship between the plurality of antennas, to configure the transmit power of the antenna.

In the plurality of antennas, when an antenna is far away from another antenna, the electronic device 100 may transmit a signal at a reference transmit power of the antenna, a limit transmit power, a preset transmit power, or a transmit power calculated based on an exposure ratio.

For example, the electronic device may determine that in the plurality of antennas, an antenna whose distance to another antenna meets a first distance condition (for example, is above the distance level 1) is a remote antenna, and in the plurality of antennas, an antenna whose distance to another antenna meets a second distance condition (for example, is below the distance level 1) is a near antenna. In some embodiments, the near antennas are several sets, including at least two antennas.

In the plurality of antennas, when there are antennas close to each other, the electronic device 100 may adjust transmit powers of the antennas that are close to each other, to enable a total exposure ratio TER of the antennas that are close to each other is less than or equal to 1. In a specific implementation, the electronic device 100 may preset the TER of these antennas that are close to each other, and then adjust, according to an exposure ratio allocation method, exposure ratios of these antennas that are close to each other, to further calculate transmit powers of these antennas.

The exposure ratio allocation method may also include but is not limited to the following manners: evenly allocating an exposure ratio to the antennas, preferentially allocating an exposure ratio to an antenna, allocating an exposure ratio based on a service type, allocating an exposure ratio based on a specific coefficient, allocating an exposure ratio based on signal strength, and the like.

Specifically, the electronic device may further determine a service type of each antenna, and allocate different exposure ratios to different antennas. The electronic device may alternatively determine signal strength of different antennas, and allocate different exposure ratios to the different antennas.

Further, after the electronic device 100 obtains the transmit powers of the antennas, the electronic device 100 may set the obtained transmit powers to average powers of the antennas by using a time average algorithm. In the actual signal transmission process, the electronic device 100 may make the average value of the transmit powers within a period of time less than or equal to the average power. In other words, instantaneous power values of the antennas at different moments may be calculated by using the time average algorithm.

For example, in the dual-antenna radiation scenario, when two antennas are far away from each other, the electronic device 100 may transmit a signal at a large transmit power without considering radiation impact between the two antennas. In this way, user safety is ensured, and the communication performance is ensured as much as possible. When the two antennas are close to each other, the electronic device 100 dynamically allocates, based on a principle of $TER \leq 1$, an exposure ratio of each antenna according to an exposure ratio allocation method, to further obtain an adjusted exposure ratio, and calculates a transmit power of the antenna based on the exposure ratio, so that the electronic device 100 can flexibly adjust the transmit power of each antenna. In this way, when the antennas are far away from each other, the transmit power of the antenna is reduced by a small amplitude, and when the antennas are close to each other, the transmit power of the antenna is reduced by a large amplitude. In addition, the electronic device 100 only needs to pre-store the reference transmit power $P_R$, a reference exposure ratio ER, and the location relationship between the antennas, and does not need to configure the transmit power of each antenna in each antenna combination in the multi-antenna scenario. This reduces transmit power configuration work in the multi-antenna scenario, and reduces memory occupied by the system. In addition, the transmit powers obtained by the electronic device 100 through calculation are determined as the average powers of the antennas by using the time average algorithm. In this way, in the actual signal transmission process, the electronic device 100 may dynamically adjust the power value of the antenna based on an actual case. This not only ensures that the user is in a safe radiation range within a period of time, but also ensures the communication quality of the electronic device 100 as much as possible.

The reference transmit power $P_R$ is a transmit power that is preconfigured by the electronic device 100 in the electronic device 100 according to the regulatory, and the power value is less than or equal to the limit transmit power $P_L$. The limit transmit power $P_L$ is a maximum transmit power that meets the regulatory requirement. A ratio of the reference transmit power $P_R$ of the antenna to the limit transmit power $P_L$ of the antenna is the reference exposure ratio ER of the antenna.

The electronic device 100 may pre-store an antenna location relationship table, or may pre-store any two of the single-antenna power configuration table, a reference exposure ratio configuration table and a limit transmit power configuration table. Specifically, the single-antenna transmit power configuration table includes a reference transmit power $P_R$ used when each antenna of the electronic device 100 separately transmits a signal, the antenna location relationship table includes a location relationship between the plurality of antennas of the electronic device 100, the limit transmit power configuration table includes a limit transmit power $P_L$ of each antenna, and the reference exposure ratio configuration table includes a reference exposure ratio ER of each antenna.

For specific descriptions of the single-antenna power configuration table, the reference exposure ratio configuration table, and the antenna location relationship table, refer to the following embodiments.

An embodiment of this application further provides a transmit power adjustment method. The method is applied to a scenario in which two antennas simultaneously transmit signals. The electronic device 100 may obtain a distance between the two antennas. When the distance between the two antennas is greater than a first value, the electronic device may adjust transmit powers of the two antennas, to enable the transmit powers of the two antennas to be respectively less than or equal to maximum transmit powers of the two antennas that meet a regulatory requirement. When the distance between the two antennas is less than the first value, the electronic device may determine the transmit powers of the two antennas on a premise that a sum of exposure ratios corresponding to the two antennas is less than or equal to 1. In this way, the electronic device 100 may determine, based on the distance between the two antennas, whether to calculate the transmit powers of the antennas based on information that the sum of exposure ratios that is less than or equal to 1.

In the wireless communication system 10 shown in FIG. 1, the electronic device 100 may obtain a location relationship between the plurality of antennas before or during communication with one or more electronic devices in the electronic devices 101 to 107 through the plurality of antennas simultaneously. When an antenna is far away from another antenna, the electronic device 100 may transmit a signal at a reference transmit power of the antenna in the single-antenna configuration table, or transmit a signal at a preset transmit power. When there are antennas close to each other, the electronic device 100 may obtain reference transmit powers of the antennas in the single-antenna configuration table and reference exposure ratios of the antennas in the reference exposure ratio configuration table, and adjust exposure ratios of the antennas according to an exposure ratio allocation method, to calculate transmit powers of the antennas, and obtain the transmit powers through calculation, to transmit a signal. In addition, the electronic device 100 may alternatively make, by using a time average algorithm, an average power of transmit powers of the electronic device 100 within a period of time not exceed finally determined transmit powers of these antennas.

Figure 3:
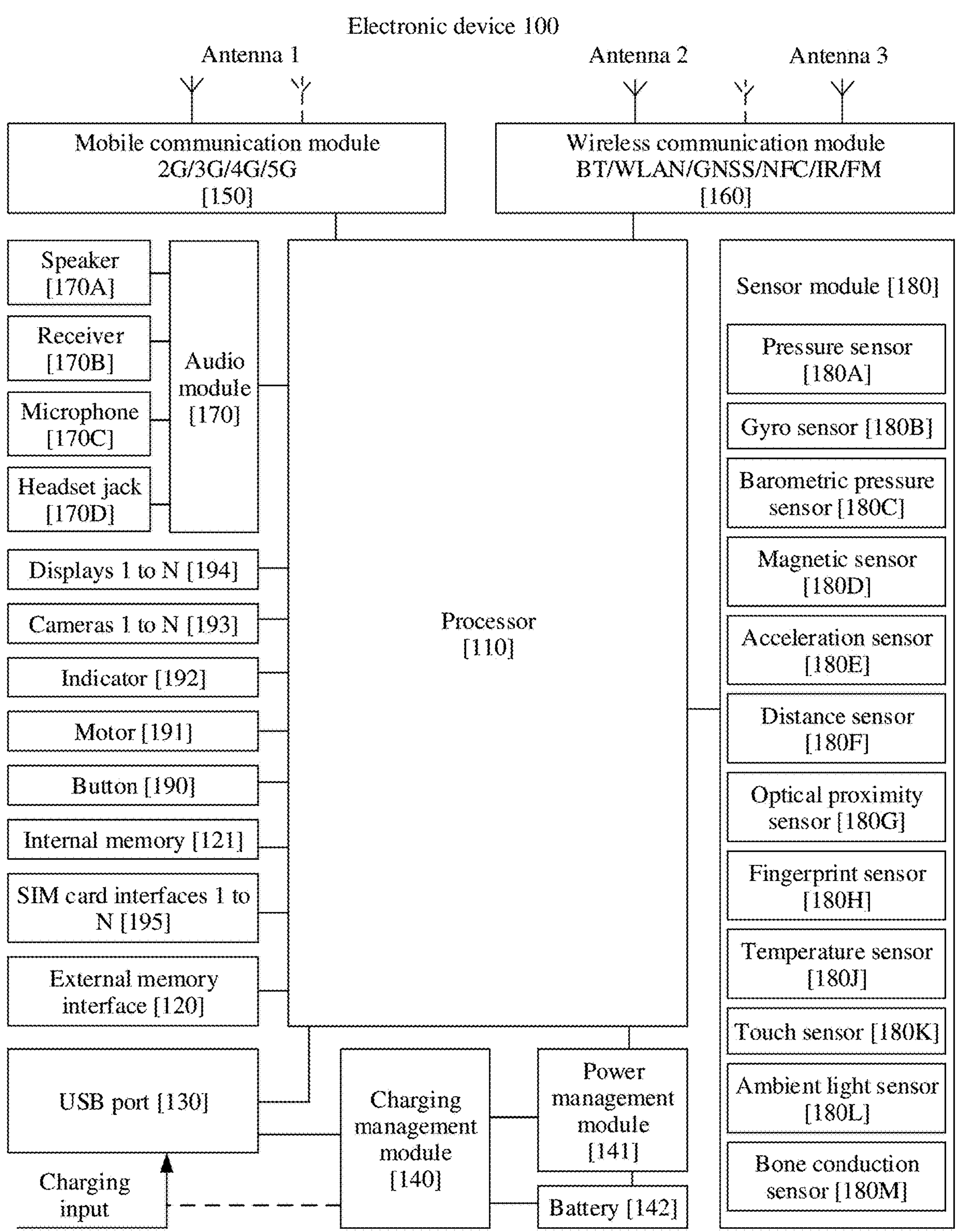
FIG. 3 is a schematic diagram of a hardware structure of an electronic device 100 according to an embodiment of this application.

FIG. 3 is a schematic diagram of a hardware structure of an electronic device 100.

The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, or a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not limited in embodiments of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

In some embodiments, the processor 110 can determine a transmit power of each antenna of the electronic device 100 based on a location relationship between the antennas. Specifically, when an antenna is far away from another antenna, the processor 110 may determine that a transmit power of the antenna is a reference transmit power. When there are antennas close to each other, the processor 110 may adjust, according to an exposure ratio allocation method, exposure ratios of the antennas that are close to each other, and calculate transmit powers of the antennas that are close to each other.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that have/has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

A wireless communication function of the electronic device 100 may be implemented by using the antenna 1, the antenna 2, an antenna 3, the mobile communication module 150, the wireless communication module 160, the modem processor, the baseband processor, and the like.

The antenna 1, the antenna 2, and the antenna 3 are configured to: transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

In some embodiments, different antennas may be divided based on a wireless communication technology. For example, the antennas 1 to 3 may include a Wi-Fi antenna, a Bluetooth antenna, an NFC antenna, a GPS antenna, and the like. Alternatively, different antennas may be divided based on data transmitted through the antennas. For example, the antennas 1 to 3 may include a data antenna, a voice antenna, and the like.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then, the demodulator transmits the low frequency baseband signal obtained through demodulation to the baseband processor for processing. The low frequency baseband signal is processed by the baseband processor and then transmitted to the application processor. The application processor outputs a sound signal through an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communication module 150 or another functional module.

In some embodiments, the modem processor may be configured to control a transmit power of an antenna, and may be further configured to identify whether the electronic device 100 is in a multi-antenna transmission scenario.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2 or the antenna 3, performs demodulation and filtering processing on an electromagnetic wave signal, and sends a processed signal to the processor 110. The wireless communication module 160 may further receive a to-be-sent signal from the processor 110, perform frequency modulation and amplification on the signal, and convert an obtained signal into an electromagnetic wave for radiation through the antenna 2 or the antenna 3.

In some embodiments, in the electronic device 100, the antenna 1 and the mobile communication module 150 are coupled, and the antenna 2 and the antenna 3 are coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

Figure 4:
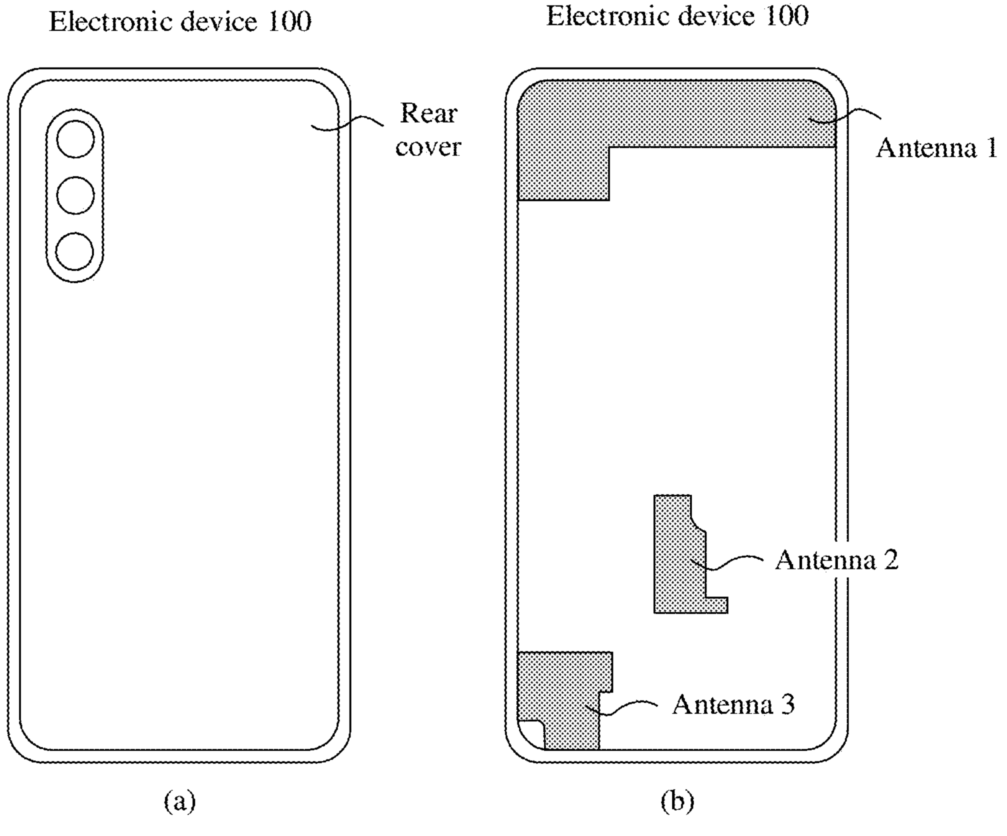
FIG. 4 is a schematic diagram of an antenna location of an electronic device 100 according to an embodiment of this application.

In some embodiments, for actual locations of the antennas 1 to 3 in the electronic device 100, refer to a structure of the electronic device shown in FIG. 4. (a) in FIG. 4 shows a side of a rear cover of the electronic device 100, and (b) in FIG. 4 shows a location relationship of antennas in the electronic device 100 after the rear cover of the electronic device 100 is removed. It can be learned from (b) in FIG. 4 that, the antenna 1 is close to the top of the electronic device 100, and is far away from the antenna 2 and the antenna 3, and the antenna 2 and the antenna 3 are close to each other.

It may be understood that the electronic device 100 may include more or fewer antennas. Antenna locations shown in FIG. 4 is merely an example for description, and does not constitute a limitation on this application.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The internal memory 121 may include one or more random access memories (random access memory, RAM) and one or more non-volatile memories (non-volatile memory, NVM).

In some embodiments, the internal memory 121 may be configured to store an antenna location relationship table, and may be further configured to store any two of a single-antenna power configuration table, a limit transmit power configuration table, and a reference exposure ratio configuration table. For specific descriptions of the single-antenna power configuration table, the reference exposure ratio configuration table, the limit transmit power configuration table, and the antenna location relationship table, refer to the following embodiments.

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like. The nonvolatile memory may include a magnetic disk storage device, a flash memory (flash memory), and the like.

The flash memory may be classified into an NOR flash, an NAND flash, a 3D NAND flash, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by using the processor 110. The random access memory may be configured to store an executable program (for example, machine instructions) in an operating system or another running program, and may be further configured to store data of a user, data of an application, and the like.

The nonvolatile memory may also store an executable program, data of a user, data of an application, and the like, which may be loaded into the random access memory in advance for directly reading and writing by using the processor 110.

The electronic device 100 may implement an audio function, for example, music playing and recording, through the audio module 170, the speaker 170A, the receiver 170B, the microphone 170C, the headset jack 170D, the application processor, and the like.

The electronic device may be a portable terminal device carrying the iOS, Android, Microsoft, or another operating system. For example, the portable terminal device may be a mobile phone, a tablet computer, or a wearable device. Alternatively, the electronic device may be a non-portable terminal device like a laptop (Laptop) having a touch-sensitive surface or a touch panel, or a desktop computer having a touch-sensitive surface or a touch panel. A software system of the electronic device 100 may use a layered architecture, an event-driven architecture, a microkernel architecture, a micro service architecture, or a cloud architecture. In this embodiment of the present invention, the Android system of a layered architecture is used as an example to illustrate a software structure of the electronic device 100.

Figure 5:
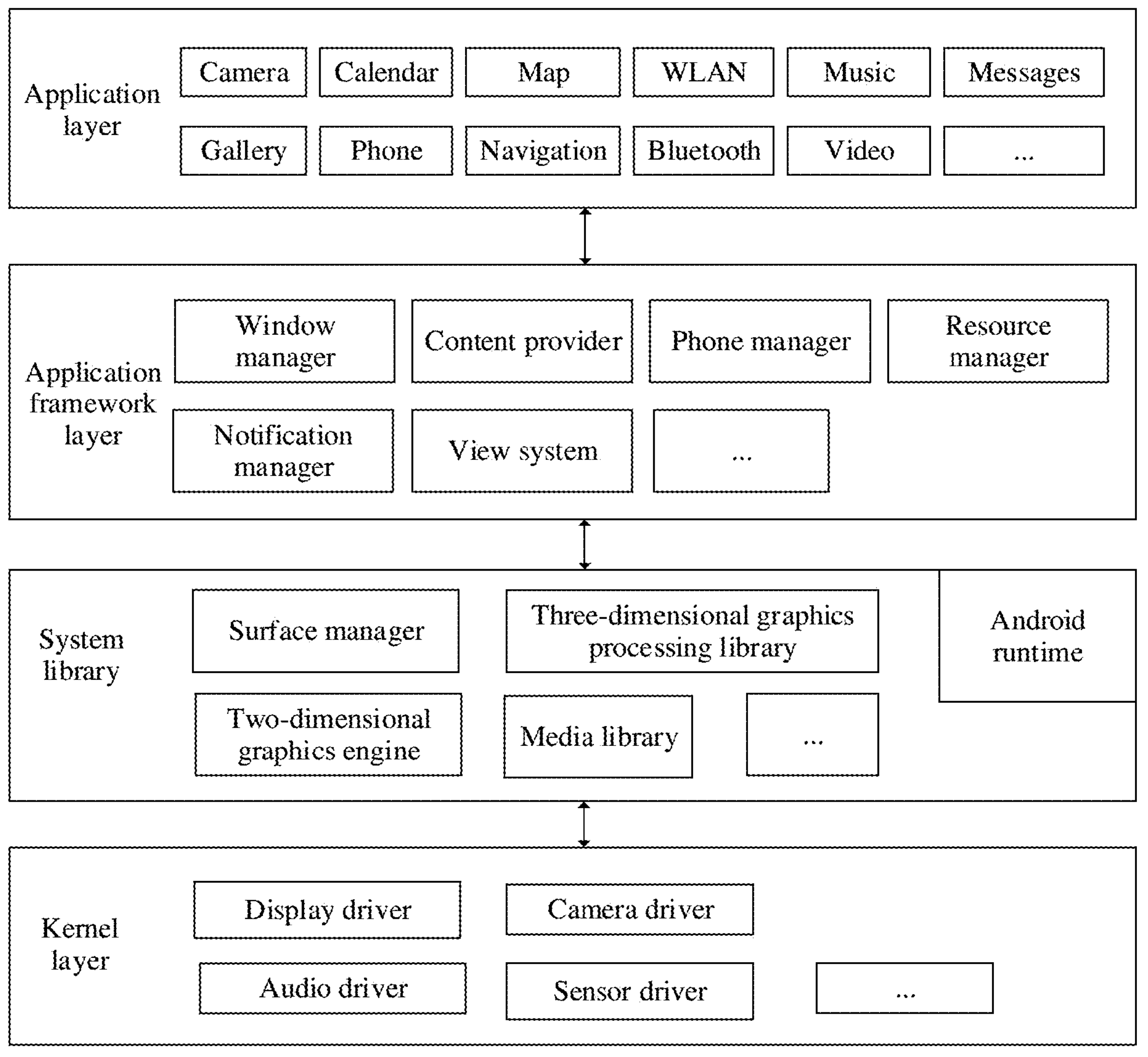
FIG. 5 is a schematic diagram of a software structure of an electronic device 100 according to an embodiment of this application.

FIG. 5 is a block diagram of a software structure of an electronic device 100 according to an embodiment of the present invention.

In a hierarchical architecture, software is divided into several layers, and each layer has a clear role and task. The layers communicate with each other through a software interface. In some embodiments, the Android system is divided into four layers: an application layer, an application framework layer, an Android runtime (Android runtime) and a system library, and a kernel layer from top to bottom.

The application layer may include a series of application packages.

As shown in FIG. 5, the application packages may include applications such as Camera, Gallery, Calendar, Phone, Map, Navigation, WLAN, Bluetooth, Music, Video, and Messages.

The application framework layer provides an application programming interface (application programming interface, API) and a programming framework for an application at the application layer. The application framework layer includes some predefined functions.

As shown in FIG. 5, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including a notification icon of Messages may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to: notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be called in a Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a transmit power adjustment method provided in an embodiment of this application.

In some embodiments, an electronic device includes a single-antenna power configuration table. For specific descriptions of the single-antenna power configuration table, refer to the foregoing related content. Details are not described herein again.

In some embodiments, the electronic device further stores limit transmit power data corresponding to different antennas. In some embodiments, the limit transmit power data may be stored in a memory of the electronic device 100 in a form of a configuration table.

A limit transmit power configuration table includes limit transmit powers $P_L$ that are of different antennas and that meet requirements of laws and regulations in different radiation test scenarios in a single-antenna transmission scenario. Table 3 shows an example of a limit transmit power configuration table of the electronic device 100. Herein, N indicates a quantity of antennas of the electronic device 100, and M indicates a quantity of SAR test scenarios. $P_LXY$ (X=1, 2, . . . , M, Y=1, 2, . . . , N) indicates a limit transmit power $P_L$ of an antenna X permitted when the electronic device 100 transmits a signal through the antenna X in a scenario Y.

TABLE 3

| | Antenna 1 | Antenna 2 | . . . | Antenna N |
|---|---|---|---|---|
| Scenario 1 | $P_L11$ | $P_L12$ | . . . | $P_L1N$ |
| Scenario 2 | $P_L21$ | $P_L22$ | . . . | $P_L2N$ |
| . . . | . . . | . . . | . . . | . . . |
| Scenario M | $P_LM1$ | $P_LM2$ | . . . | $P_LMN$ |

Similarly to the single-antenna power configuration table, the powers in the limit transmit power configuration table are also obtained by placing the electronic device 100 in a radiation indicator test environment to test, for example, in Table 3, the powers may be transmit powers used by antennas when the electronic device 100 is placed in an SAR test environment and a tested SAR value is equal to an SAR limit value. For details about an SAR test process, refer to the related description of the single-antenna power configuration table. Alternatively, the powers in the limit transmit power configuration table may be obtained through simulation calculation. A manner of calculating the powers in the limit transmit power configuration table is not limited in embodiments of this application.

In some embodiments, the electronic device stores reference exposure ratio configuration data of different antennas, and the reference exposure ratio configuration data may be stored in the memory of the electronic device in the form of a configuration table.

A reference exposure ratio configuration table includes reference exposure ratios ER of different antennas in different scenarios. Table 4 shows an example of a reference exposure ratio configuration table of the electronic device 100.

TABLE 4

| | Antenna 1 | Antenna 2 | ... | Antenna N |
|---|---|---|---|---|
| Scenario 1 | Ratio11 | Ratio12 | .. | Ratio1N |
| Scenario 2 | Ratio21 | Ratio22 | ... | Ratio2N |
| ... | ... | ... | ... | ... |
| Scenario M | RatioM1 | RatioM2 | ... | RatioMN |

A reference exposure ratio of an antenna is a ratio of an actual SAR generated when the antenna transmits a signal at a reference transmit power $P_R$ in the single-antenna power configuration table to an SAR limit value in an SAR specification. If the exposure ratio is less than or equal to 1, the greater the exposure ratio is, the closer the power of the antenna is to a limit transmit power in the SAR specification. In the single-antenna power configuration table configured in the electronic device 100, each reference transmit power $P_R$ does not exceed a power value in the SAR specification. However, the reference transmit power $P_R$ cannot represent a relationship with the limit transmit power in the SAR specification, and the reference exposure ratio ER in the reference exposure ratio configuration table can clearly indicate a ratio relationship or a value relationship between the reference transmit power $P_R$ and the limit transmit power $P_L$ in the SAR specification.

For example, in the scenario 1, based on the single-antenna power configuration table, a reference transmit power $P_R$ of the antenna 1 is 150 mW, and based on the reference exposure ratio configuration table, an exposure ratio of the antenna 1 is 0.6. The power is in direct proportion to the SAR. If a limit transmit power of the antenna 1 in the SAR specification is $P_{L1}$, $150:P_{L1}=0.6$, so that the limit transmit power of the antenna 1 in the SAR specification is $P_{L1}=150/0.6=250$ mW.

It can be learned that, the ER of the antenna≤1, and when the ER=1, a permissive reference transmit power $P_R$ of the antenna is equal to the limit transmit power $P_L$ in the SAR specification.

It can be learned that the reference exposure ratio configuration table is related to the single-antenna power configuration table and the limit transmit power configuration table of the antenna. Because the ratio of the reference transmit power $P_R$ of the antenna to the limit transmit power $P_L$ of the antenna is the reference exposure ratio ER of the antenna, in an actual case, the electronic device 100 may obtain a value in another configuration table only by configuring with any two of the single-antenna power configuration table, the limit transmit power configuration table, and the reference exposure ratio configuration table. For example, when the electronic device 100 is configured with the single-antenna power configuration table and the reference exposure ratio configuration table, the limit transmit power $P_L$ ($P_L=P_R/ER$) of the antenna may be obtained through calculation based on the reference transmit power $P_R$ of the antenna in the single-antenna power configuration table and the reference exposure ratio ER of the antenna in the reference exposure ratio configuration table.

In some embodiments, the electronic device further stores antenna location relationship data. It should be understood that the antenna location relationship data may also be stored in the memory of the electronic device in the form of a configuration table.

In a multi-antenna transmission scenario, a magnitude of electromagnetic radiation of the electronic device 100 is further related to a location relationship between antennas that transmit signals. When the antennas are close to each other, electromagnetic radiation generated between the antennas is superposed. When the antennas are far away from each other, electromagnetic radiation generated between the antennas is not superposed.

Figure 6:
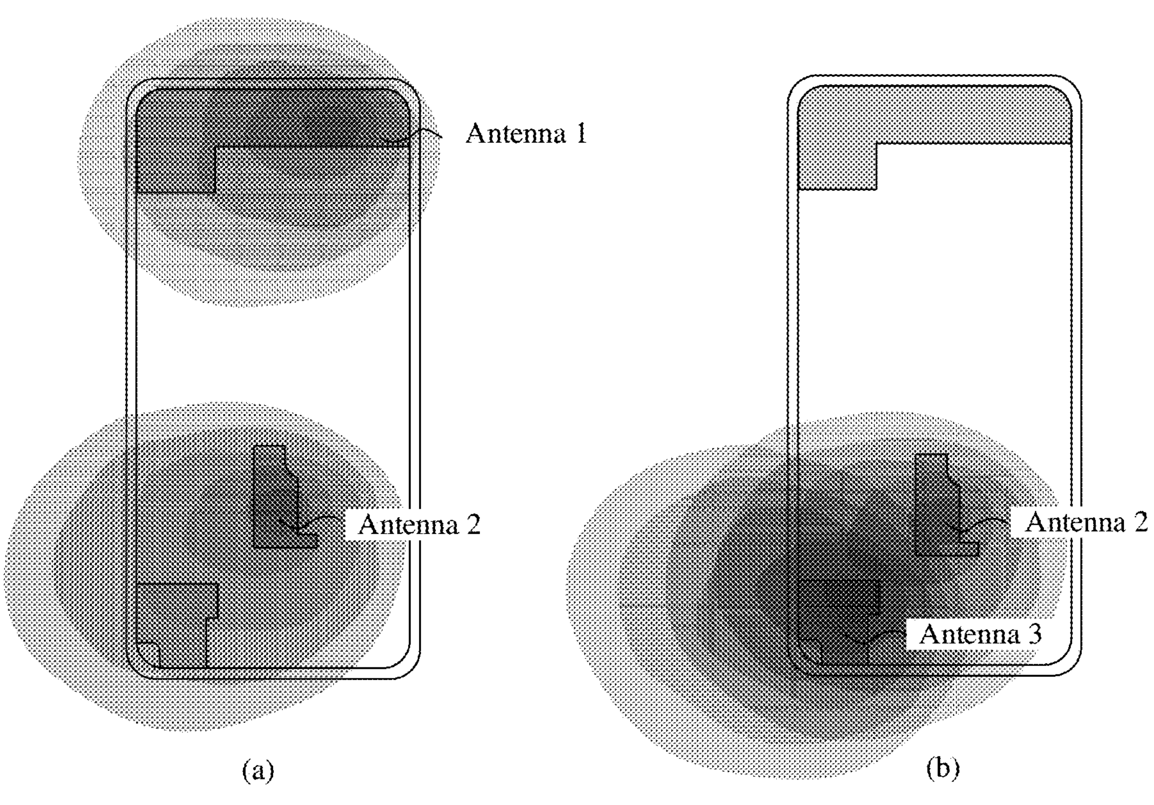
FIG. 6 is a schematic diagram of a distribution of electromagnetic radiation generated by an antenna when the antenna transmits a signal according to an embodiment of this application.

FIG. 6 is an example of a schematic diagram of a distribution of electromagnetic radiation of antennas when the antennas at different locations of the electronic device 100 simultaneously transmit radio signals. The deeper the color of the region in which the antenna is located, the larger the SAR. (a) in FIG. 6 is a schematic diagram of a distribution of electromagnetic radiation generated by two antennas (the antenna 1 and the antenna 2) that are far away from each other when the two antennas simultaneously transmit radio signals. It can be learned that, because the antenna 1 and the antenna 2 are far away from each other, electromagnetic radiation generated by the antenna 1 and the antenna 2 is not superposed on each other, or electromagnetic radiation generated after superposition is small (less than a larger value in SARs generated when the antenna 1 or the antenna 2 transmits a radio signal separately). Therefore, in this scenario, a maximum SAR value is equivalent to the larger value in the SARs generated when the antenna 1 and the antenna 2 transmit radio signals separately. (b) in FIG. 6 is a schematic diagram of a distribution of electromagnetic radiation generated by two antennas (the antenna 2 and an antenna 3) that are close to each other when the two antennas simultaneously transmit radio signals. It can be learned that, because the antenna 2 and the antenna 3 are close to each other, electromagnetic radiation generated by the antenna 2 and the antenna 3 is superposed, and superposed electromagnetic radiation is large (greater than a larger value in SARs generated when the antenna 3 or the antenna 2 transmits a radio signal separately). Therefore, in this scenario, a maximum SAR value is greater than the larger value in the SARs generated when the antenna 3 or the antenna 2 transmits a radio signal separately, and is less than a sum of the SARs generated when the antenna 3 and the antenna 2 transmit signals simultaneously.

In this case, in the multi-antenna transmission scenario, the electronic device 100 may determine, with reference to the location relationship between the antennas, whether to use a reference transmit power $P_R$ configured for each antenna in a single-antenna configuration scenario, or reduce the transmit power of each antenna.

In some embodiments, the antenna location relationship table may include the location relationship between the antennas, and the location relationship may be "close" or "far away". Alternatively, the location relationship may be different distance levels, for example, a first distance and a second distance, where the first distance is greater than the second distance. Alternatively, the antenna location relationship table may include a distance between the antennas, for example, 1 centimeter. Table 5 shows an example of an antenna location relationship table of the electronic device 100.

TABLE 5

| Antenna X | Antenna Y | Location relationship |
|---|---|---|
| Antenna 1 | Antenna 2 | Far away |
| Antenna 1 | Antenna 3 | Far away |
| Antenna 2 | Antenna 3 | Close |

It may be understood that Table 5 merely shows an example of the location relationship between the antennas in the electronic device 100. In another embodiment of this application, the location relationship between the antennas may alternatively be represented in another manner. For example, a set indicates the location relationship between the antennas. A set 1 includes the antenna 2 and the antenna 3, and a set 2 includes the antenna 1. Radiation between the antennas in a same set generates a superposition effect, and radiation between the antennas in different sets does not generate a superposition effect, that is, the antenna 2 is close to the antenna 3, and both the antenna 2 and the antenna 3 are far away from the antenna 1. A definition of the location relationship between the antennas is not limited in embodiments of this application. In addition, the antenna location relationship table may alternatively be represented as a radiation hotspot location relationship table. The name is not limited in embodiments of this application.

The electronic device can allocate, based on the location relationship between the antennas, the exposure ratio of the antenna by using different exposure ratio allocation policies.

The exposure ratio allocation method may include but is not limited to the following manners:

(1) Evenly Allocating an Exposure Ratio to Antennas

In this case, exposure ratios of the antennas are equal. Specifically, if a TER of the electronic device 100 is X, and a quantity of the plurality of antennas is Y, the exposure ratios of the antennas are X/Y.

(2) Preferentially Allocating an Exposure Ratio

The electronic device 100 may preferentially ensure that an exposure ratio of an antenna is equal to or close to a reference exposure ratio of the antenna in the reference exposure ratio configuration table, to ensure that communication quality of the antenna is in an optimal state, and then allocate a remaining exposure ratio to another antenna.

(3) Allocating an Exposure Ratio Based on a Service Type

The service type may include a voice service, a data service, and the like.

In some embodiments, the electronic device 100 may preferentially satisfy an exposure ratio of an antenna for transmitting a data service signal, to ensure communication quality of data transmission of the electronic device 100.

(4) Allocating an Exposure Ratio Based on a Ratio of Exposure Ratios

The electronic device 100 may determine an exposure ratio of each antenna in the multi-antenna transmission scenario based on a ratio of reference exposure ratios of the antennas in the reference exposure ratio configuration table.

For example, the antennas 1 to 3 are close together in the multi-antenna transmission scenario, and a ratio of reference exposure ratios of the antennas in the reference exposure ratio configuration table is a:b:c. When the TER of the electronic device 100 is X, an adjusted exposure ratio of the antenna 1 is X×a/(a+b+c), an adjusted exposure ratio of the antenna 2 is X×b/(a+b+c), and an adjusted exposure ratio of the antenna 3 is X×c/(a+b+c).

(5) Allocating an Exposure Ratio Based on Signal Strength

Specifically, an exposure ratio allocated to a strong-signal antenna may be less than an exposure ratio allocated to a weak-signal antenna. In this way, in the multi-antenna transmission scenario, compared with another strong-signal antenna, a weak-signal antenna may obtain a large transmit power, to avoid a signal interruption of the weak-signal antenna in the multi-antenna transmission scenario.

It may be understood that, when the electronic device 100 allocates the exposure ratios of the antennas, the electronic device 100 may calculate the exposure ratios of the antennas according to one or more exposure ratio allocation policies. For example, the electronic device 100 may first preferentially allocate an exposure ratio of an antenna according to the method of preferentially allocating an exposure ratio, and then another antenna may evenly allocate the remaining exposure ratio according to the allocation method of evenly allocating an exposure ratio to the antennas. In addition, in embodiments of this application, the electronic device 100 may further include another exposure ratio allocation method. This is not limited in embodiments of this application.

In a multi-antenna transmission process, for a plurality of antennas that are close to each other, the electronic device 100 may adjust the exposure ratio of each antenna according to an exposure ratio allocation method, so that a sum TER of exposure ratios of the antennas is less than or equal to 1, to ensure that impact of electromagnetic radiation of the electronic device 100 on a human body is within a safe range. For a plurality of antennas that are far away from each other, the electronic device 100 may also adjust an exposure ratio of each antenna according to an exposure ratio allocation method, and a sum TER of exposure ratios of the antennas may be greater than or equal to 1. In this way, the electronic device 100 can dynamically adjust transmit powers of the plurality of antennas that are far away from each other. For example, when the antenna 1 and the antenna 2 are far away from each other, and a superposition of radiation between the antenna 1 and the antenna 2 is small, the electronic device 100 may allocate exposure ratios of the antenna 1 and the antenna 2 based on signal strength. When a signal of the antenna 1 is weaker than a signal of the antenna 2, the electronic device 100 may adjust the exposure ratio of the antenna 1 to be greater than the exposure ratio of the antenna 2, so that the antenna 1 can transmit a signal at a large transmit power, so as to ensure communication performance of the antenna.

After the electronic device 100 obtains an adjusted exposure ratio ER' of each antenna, the electronic device 100 may calculate a transmit power P of the antenna based on the adjusted exposure ratio ER', a reference transmit power $P_R$ in the single-antenna power configuration table, and a reference exposure ratio ER in the reference exposure ratio configuration table.

Because the power (unit: mW) is in direct proportion to the exposure ratio, the electronic device 100 may calculate the transmit power P of the antenna according to Formula 5.

$$\frac{P_R}{P} = \frac{ER}{ER'} \quad \text{Formula 5}$$

Herein, ER is a reference exposure ratio in the reference exposure ratio configuration table, ER' is an adjusted exposure ratio calculated according to an exposure ratio allocation method, $P_R$ is a reference transmit power in the single-antenna power configuration table, and P is a finally adjusted transmit power.

It may be understood that, in the multi-antenna transmission scenario, if a single antenna is far away from another antenna, the antenna may transmit a signal at the reference transmit power in the single-antenna transmission scenario as the $P_R$.

In some embodiments, the electronic device may further calculate, by using a time average algorithm, an instantaneous transmit power of the antenna based on the adjusted transmit power P of the antenna.

The adjusted transmit power P obtained by the electronic device 100 through calculation may be an average transmit power of the antenna. In this case, in a process in which the antenna actually transmits a signal, an instantaneous value of an actual transmit power may be larger than the average transmit power or smaller than the average transmit power, provided that an average value of actual transmit powers within a period of time (for example, 6 minutes) does not exceed the adjusted transmit power P.

Figure 7:
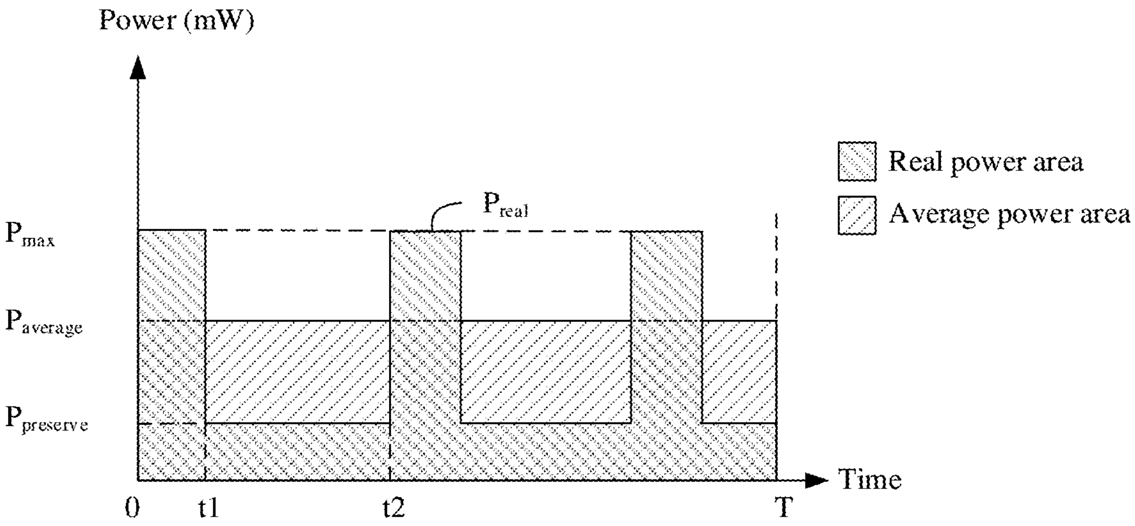
FIG. 7 is a schematic diagram of a relationship between an actual transmit power and an adjusted transmit power of an electronic device 100 according to an embodiment of this application.

FIG. 7 is an example of a schematic diagram of a relationship between an actual transmit power and an adjusted transmit power P in a process in which an electronic device 100 controls a transmit power by using a time average algorithm. It can be learned from FIG. 7 that, in a time period 0 to t1, the instantaneous value of the actual transmit power of the electronic device 100 is $P_{max}$. To control the average value of the transmit powers to be less than or equal to the transmit power P, the electronic device 100 may decrease the actual transmit power by a specific value, for example, by 3 dB, and transmit a signal at a low transmit power. The low transmit power may be a preserved power $P_{preserve}$. Then, the electronic device 100 may increase the transmit power again, and continue to transmit a signal at a high transmit power. In this way, the electronic device transmits a signal at a fluctuating transmit power, so that the average value of the actual transmit powers is less than or equal to the transmit power P. It can be learned that when the average value of the actual transmit powers is less than or equal to the transmit power P, a real power area is less than or equal to an average power area.

In conclusion, when the electronic device 100 adjusts the transmit power by using the time average algorithm, the electronic device 100 needs to set a preserved power $P_{preserve}$, where the preserved power $P_{preserve}$ is less than the transmit power P, and a difference between the preserved power $P_{preserve}$ and the transmit power P is a fixed value, for example, 3 dBm. The preserved power $P_{preserve}$ can enable the electronic device 100 to reduce the transmit power after transmitting a signal at a high transmit power, so that the average value of the actual transmit powers does not exceed the transmit power P, to ensure user safety.

In an actual case, when the electronic device adjusts the transmit power by using the time average algorithm, and sets the preserved power $P_{preserve}$, a fluctuation amplitude of the transmit power of the antenna is excessively large, and stability in a communication process is affected. In this case, the electronic device 100 may not set the preserved power $P_{preserve}$, but limit the maximum value of the actual transmit power, to ensure that the electronic device 100 does not transmit a signal at an excessive fluctuating transmit power, so as to maintain communication stability.

In this embodiment of this application, in a multi-antenna radiation scenario, because distances between the antennas are different, the electronic device 100 may determine transmit powers of the antennas based on different policies.

In a specific implementation, when the electronic device 100 is in the multi-antenna transmission scenario, the electronic device 100 may determine, based on a distance between any two antennas, a method for the two antennas to adjust transmit powers of the two antennas.

The method is for determining the transmit power of the antenna. The method may include but is not limited to the following two cases.

(1) Directly Determine a Transmit Power of Each Antenna Based on a Configuration Table or a Preset Value.

The configuration table may be the single-antenna power configuration table. In this case, the electronic device 100 may determine the transmit power of each antenna based on the reference transmit power $P_R$ in the single-antenna power configuration table. The configuration table may alternatively be the limit transmit power configuration table. In this case, the electronic device 100 may determine the transmit power of each antenna based on the limit transmit power $P_L$ in the limit transmit power configuration table. The configuration table may alternatively be a single-antenna exposure ratio configuration table. The electronic device 100 configures an exposure ratio for each antenna based on an exposure ratio in the single-antenna exposure ratio configuration table, and may calculate the transmit power of each antenna based on the exposure ratio and a limit transmit power of a single antenna. Alternatively, the electronic device 100 may preset a power value, where the preset power value is less than or equal to limit transmit powers $P_L$ of all antennas, and the electronic device 100 may determine the transmit power of the antenna based on the preset power value. For specific descriptions of directly determining, by the electronic device 100, the transmit power of the antenna based on the configuration table or the preset value, refer to related descriptions of the power adjustment method in the following method embodiments.

For example, when a distance between two antennas is above or at a distance level 1, it may be considered that a superposition degree of radiation of the two antennas is weak, and the electronic device 100 may directly determine a transmit power of each antenna based on the configuration table or the preset value.

(2) Calculate a Transmit Power of an Antenna According to an Exposure Ratio Allocation Method The electronic device 100 may calculate an exposure ratio of the antenna according to the exposure ratio allocation method.

The exposure ratio allocation method includes: evenly allocating an exposure ratio to the antennas, allocating an exposure ratio based on a specific proportion coefficient, and the like. Alternatively, the electronic device may preferentially allocate an exposure ratio based on a service type, and/or allocate an exposure ratio based on signal strength.

For example, when a distance between two antennas is below a distance level 1, it may be considered that the two antennas are close to each other, and a superposition degree of radiation of the two antennas is large. In this case, the transmit power of the antenna may be calculated according to the exposure ratio allocation method.

The electronic device pre-determines a location relationship between antennas in a dual-antenna radiation state, and configures, by using different policies, transmit powers for dual antennas that transmit signals. This can avoid manually configuring transmit powers of the antennas in a dual-antenna radiation scenario, and can ensure the communication quality while ensuring that a radiation indicator does not exceed a regulatory value.

Further, when the electronic device 100 includes a plurality of antennas (more than two) and is in the multi-antenna transmission scenario, the electronic device 100 may determine power values of any two antennas based on a distance between the two antennas. Finally, the electronic device 100 determines a minimum power value of an antenna as a transmit power of the antenna. In this way, it is ensured that the antenna adjusts the transmit power based on different policies at different distances, and a final transmit power of the antenna can enable the user to be in a safe radiation range.

In some embodiments, when distances between the antennas are different, the electronic device 100 may determine the transmit powers of the antennas based on different exposure ratio allocation policies.

Figure 8:
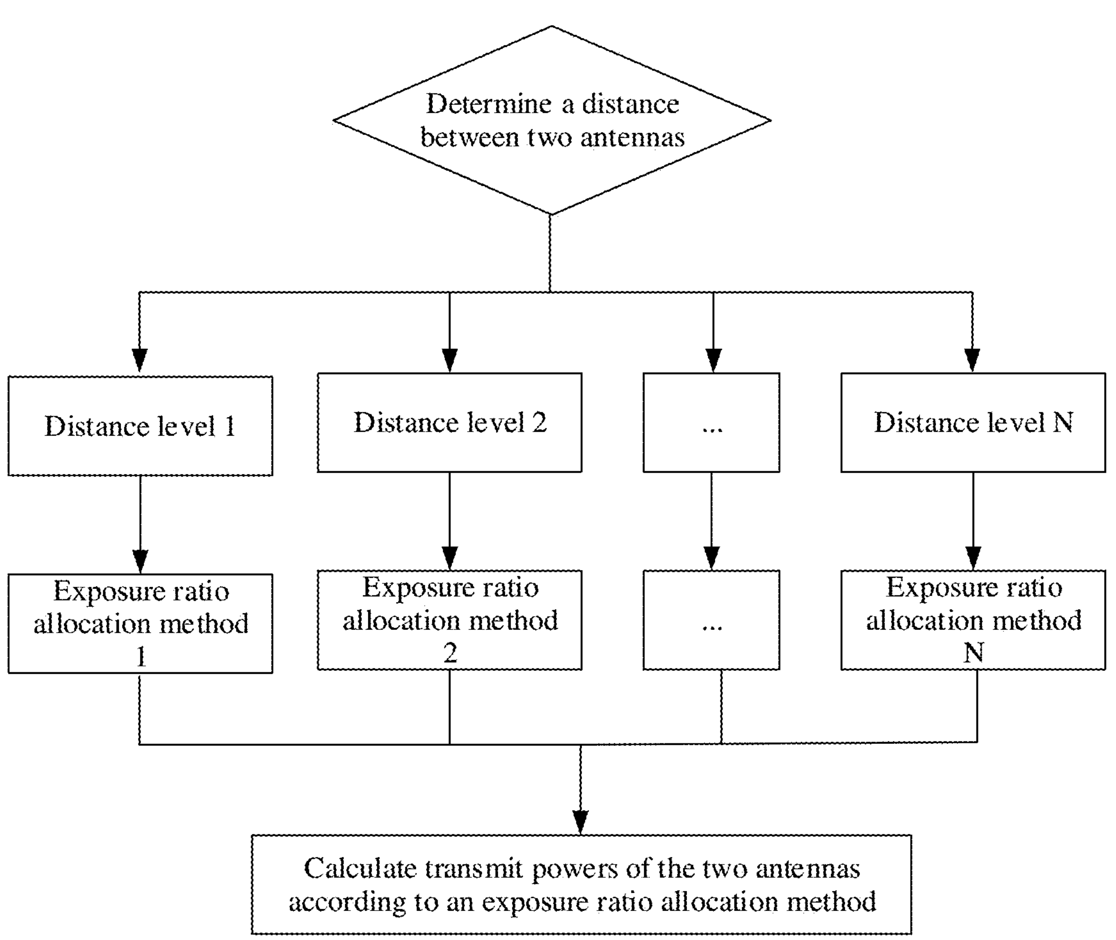
FIG. 8 is a principle of determining, by an electronic device, transmit powers of two antennas based on a distance according to an embodiment of this application.

FIG. 8 shows an example of a principle of determining, by an electronic device 100, transmit powers of two antennas based on a distance between the antennas.

As shown in FIG. 8, when the distance between the two antennas is at the distance level 1, the electronic device 100 may calculate the transmit powers of the two antennas according to an exposure ratio allocation method 1. When the distance between the two antennas is at a distance level 2, the electronic device 100 may calculate the transmit powers of the two antennas according to an exposure ratio allocation method 2. By analogy, when the distance between the two antennas is at a distance level N, the electronic device 100 may calculate the transmit powers of the two antennas according to an exposure ratio allocation method N. Distance levels 1, 2, . . . , N indicate different distances between the two antennas. The electronic device 100 may view the distance between the two antennas based on the antenna location relationship table. Exposure ratio allocation policies 1, 2, . . . , and N indicate different exposure ratio allocation policies.

The exposure ratio allocation policies may include but are not limited to the following manners: evenly allocating an exposure ratio to the antennas, preferentially allocating an exposure ratio, allocating an exposure ratio based on a service type, allocating an exposure ratio based on a specific coefficient, allocating an exposure ratio based on signal strength, and the like.

For example, when the electronic device 100 transmits a signal through the antenna 1 and the antenna 2 simultaneously, the electronic device 100 may first preset a total exposure ratio TER. When a distance between the antenna 1 and the antenna 2 is at the distance level 1, the electronic device 100 may determine exposure ratios of the antenna 1 and the antenna 2 according to the exposure ratio allocation method of allocating an exposure ratio based on signal strength. When a distance between the antenna 1 and the antenna 2 is at the distance level 2, the electronic device 100 determines exposure ratios of the antenna 1 and the antenna 2 according to the method of evenly allocating an exposure ratio, and then obtains transmit powers of the antenna 1 and the antenna 2 through calculation based on the exposure ratio.

Figure 9:
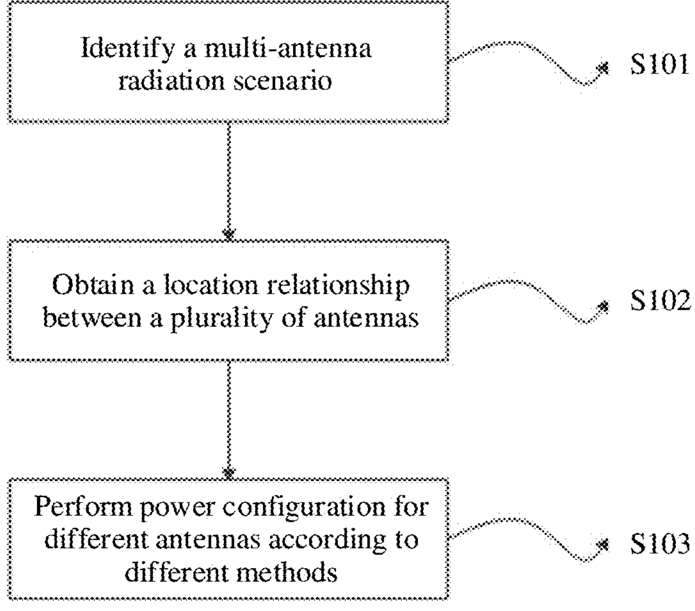
FIG. 9 is a method flowchart of a transmit power adjustment method according to an embodiment of this application.

With reference to FIG. 9, the following describes a method flowchart of a transmit power adjustment method according to an embodiment of this application.

As shown in FIG. 9, the method includes the following steps.

S101: Identify a multi-antenna transmission scenario.

The multiple-antenna transmission scenario includes the following cases.

(1) The electronic device 100 is currently transmitting signals simultaneously through a plurality of antennas.

(2) The electronic device 100 is about to simultaneously transmit signals through a plurality of antennas within a first time period.

When the electronic device simultaneously transmits the signals through the plurality of antennas, the following several cases may be included.

(1) The electronic device 100 receives an instruction sent by a network device for indicating to run the plurality of antennas.

The network device may be a device like a base station or a server. For example, the network device may determine, based on strength of a signal sent by the electronic device 100, whether to send, to the electronic device 100, the instruction for indicating to run the plurality of antennas.

(2) The electronic device 100 simultaneously communicates with a network or another device by using different wireless communication technologies.

The wireless communication technologies mainly include a Wi-Fi technology, a Bluetooth technology, an NFC technology, a GNSS technology, and the like. The electronic device 100 may include a plurality of antennas corresponding to the different wireless communication technologies. For example, an antenna 1 of the electronic device 100 may be a Wi-Fi antenna, and an antenna 2 of the electronic device 100 may be a Bluetooth antenna.

The electronic device 100 may directly communicate with the network or the another device by using the different wireless communication technologies. For example, the electronic device 100 may establish a Wi-Fi connection to an electronic device 1 (for example, a mobile phone or a computer) through the antenna 1, and establish a Bluetooth connection to an electronic device 2 (for example, a Bluetooth headset, a smart band, or a smartwatch) through the antenna 2.

Alternatively, the electronic device 100 may transmit signals through the plurality of antennas when running a plurality of applications simultaneously. In this case, different applications use different wireless communication technologies. For example, in a process in which the electronic device 100 runs an office application to upload a file, the electronic device 100 runs a telephone application to make a call. In this case, the electronic device 100 may send, through the antenna 1, a signal to a server corresponding to the office application, and send, through the antenna 2, a signal to a base station, to implement a call service with another device.

Specifically, the electronic device 100 may identify, by using a modem (modem) processor, whether the electronic device 100 transmits radio signals through the plurality of antennas. The modem processor is configured to control a signal transmission process of an antenna and adjust a transmit power of the antenna. When the modem processor simultaneously controls signal transmission of the plurality of antennas, the electronic device 100 may determine that the electronic device 100 is currently in the multi-antenna transmission scenario.

S102: Obtain a location relationship between the plurality of antennas.

The plurality of antennas may include an antenna that is transmitting a signal or is about to transmit a signal.

Specifically, the electronic device 100 may obtain the location relationship between the antennas from an antenna location relationship table. The location relationship of the antennas may be "close" or "far away", or a specific distance between the antennas, or the location relationship may be different distance levels, for example, a first distance and a second distance. For specific content of the antenna location relationship table, refer to content shown in Table 5.

In some embodiments, the antenna location relationship table may be stored in the internal memory 121 (for example, an NVM) of the electronic device 100.

S103: Perform power configuration for different antennas according to different policies.

The electronic device 100 determines a distance between the antennas based on the location relationship between the plurality of antennas.

When an antenna is far away from another antenna, the electronic device 100 may transmit a signal according to a power adjustment method.

That the antenna is far away from the another antenna may mean that a location relationship between the antenna and the another antenna is "far away", or a distance between the antenna and the another antenna is greater than a threshold or above a distance level. In this case, when the antenna transmits a signal, electromagnetic radiation of the antenna is not superposed with electromagnetic radiation of the another antenna.

The power adjustment method may be used by the electronic device 100 to obtain a transmit power of the antenna. The power adjustment method is a part of policies used by the electronic device 100 to adjust the transmit power of the antenna. These policies are applicable to an antenna whose radiation has no superposition effect or has a weak radiation superposition effect with radiation of the another antenna. The power adjustment method includes but is not limited to the following several types.

(1) The electronic device 100 transmits a signal at a reference transmit power $P_R$ of the antenna.

To be specific, the electronic device 100 may transmit the signal at a power value in a single-antenna power configuration table. The power value does not exceed a limit transmit power $P_L$ in a regulatory requirement, to ensure that a user is in a safe radiation range.

(2) The electronic device 100 transmits a signal at a preset power value.

To be specific, the electronic device 100 may preset a preset power value. The preset power value is less than or equal to limit transmit powers $P_L$ of all antennas. When the antenna needs to transmit the signal according to the power adjustment method, the electronic device 100 does not need to search a single-antenna power configuration table for a power value of the antenna. This reduces a time period for the electronic device 100 to determine the transmit power of the antenna, and increases a signal transmission speed of the antenna.

(3) The electronic device 100 transmits a signal at a limit transmit power $P_L$ of the antenna.

To be specific, the electronic device 100 may transmit the signal at a power value in a limit transmit power configuration table. The power value is a limit transmit power $P_L$ in a regulatory requirement, to ensure that the transmit power is increased as much as possible when a user is in a safe radiation range.

(4) The electronic device 100 adjusts the transmit power of the antenna based on an exposure ratio.

Specifically, the electronic device 100 may preset a maximum exposure ratio, so that an exposure ratio of a single antenna and a total exposure ratio of the plurality of antennas are both less than or equal to the maximum exposure ratio. In this case, the electronic device 100 can calculate the transmit power of the antenna based on the preset maximum exposure ratio, a reference transmit power $P_R$ of the antenna, and a reference exposure ratio ER of the antenna, and transmit a signal at the transmit power. In this way, the electronic device 100 may preferentially meet a configuration requirement of the electronic device 100, so that the antenna can transmit the signal based on a preset exposure ratio.

For example, when the maximum exposure ratio preset by the electronic device 100 is R1, the antenna 1 is far away from another antenna, a reference transmit power of the antenna 1 is P1, and a reference exposure ratio of the antenna 1 is R2, a transmit power of the antenna 1 is R2/R1×P1.

It may be understood that the power adjustment method is not limited to the foregoing several manners. This is not limited in embodiments of this application.

It should be understood that, in some embodiments, a quantity of antennas in the electronic device 100 that are far away from another antenna is not limited. For example, in a three-antenna radiation scenario of the electronic device 100, a distance between every two antennas exceeds a distance threshold, and a power is configured for each of the three antennas according to the power adjustment method.

When there are antennas that are close to each other, the electronic device determines whether a total reference exposure ratio TER between the antennas that are close to each other is less than or equal to 1.

The antennas that are close to each other include more than two antennas. The antennas that are close to each other may mean that a location relationship between these antennas is "close", or a distance between these antennas is less than a threshold or below a distance level. In this case, electromagnetic radiation generated by these antennas is superposed. The electronic device 100 needs to measure, based on the total reference exposure ratio TER, whether electromagnetic radiation of the electronic device exceeds a standard value when these antennas transmit signals simultaneously. It should be understood that, in some embodiments, an antenna that is far away from another antenna may exist, and an antenna that is close to another antenna may also exist. For example, the electronic device 100 transmits a signal through three antennas. The antenna 1 is far away from both the antenna 2 and an antenna 3. The electronic device configures a transmit power for the antenna 1 according to the power adjustment method. The antenna 2 is close to the antenna 3. The electronic device determines whether a total reference exposure ratio TER between the antennas 2 and 3 is less than or equal to 1, to configure transmit powers for the antennas 2 and 3.

The total reference exposure ratio TER is a sum of reference exposure ratios ER of the antennas that are close to each other. Specifically, the electronic device 100 may obtain the reference exposure ratio ER of the antenna from a reference exposure ratio configuration table, or calculate the reference exposure ratio ER of the antenna based on a single-antenna configuration table and the limit transmit power configuration table.

If the total reference exposure ratio TER between the antennas that are close to each other is less than or equal to 1, the electronic device 100 transmits a signal at a reference transmit power $P_R$ or a transmit power determined based on a preset exposure ratio.

When the total reference exposure ratio is less than or equal to 1, it indicates that, when the electronic device 100 transmits a signal at the reference transmit power $P_R$, electromagnetic radiation of the electronic device 100 does not exceed a standard value. Therefore, the electronic device 100 may transmit a signal at the reference transmit power $P_R$.

Alternatively, the electronic device 100 may preset a total exposure ratio TER, where the total exposure ratio TER≤1. The electronic device 100 may allocate, based on the preset total exposure ratio TER, exposure ratios of these antennas that are close to each other, and then calculate transmit powers of these antennas based on the exposure ratios allocated to the antennas. Specifically, the electronic device 100 may allocate the exposure ratios of the antennas according to an exposure ratio configuration method. The exposure ratio allocation method may include but is not limited to the following manners: evenly allocating an exposure ratio to the antennas, preferentially allocating an exposure ratio, allocating an exposure ratio based on a service type, allocating an exposure ratio based on a specific coefficient, allocating an exposure ratio based on signal strength, and the like.

When the total reference exposure ratio TER is greater than 1, it indicates that, when the electronic device 100 transmits a signal at the reference transmit power, electromagnetic radiation of the electronic device 100 exceeds a standard value, and the electronic device 100 needs to adjust transmit powers of the antennas that are close to each other. The electronic device 100 may adjust the transmit powers of the antennas that are close to each other, so that a total exposure ratio TER of the antennas that are close to each other is less than or equal to 1, and the antenna transmits a signal at an adjusted transmit power.

For these antennas that are close to each other, the electronic device 100 may adjust an exposure ratio of each antenna according to the exposure ratio allocation method, and then the electronic device 100 obtains an adjusted transmit power P based on an adjusted exposure ratio ER', the reference exposure ratio ER, and the reference transmit power $P_R$. For specific descriptions of the exposure ratio allocation method, refer to the foregoing content.

Specifically, the electronic device 100 may calculate, according to Formula 5, the transmit power P of the antenna with reference to the reference transmit power $P_R$, the exposure ratio ER, and the adjusted exposure ratio ER' of the antenna.

The following describes, by using a specific example, a process in which the electronic device 100 adjusts the transmit power based on the location relationship of the antennas. It is assumed that the electronic device 100 enables the antennas 1 to 3 to simultaneously transmit signals. It is assumed that the reference transmit powers $P_R$ of the antennas 1 to 3 are respectively 120 mW, 140 mW, and 160 mW, the reference exposure ratios ER are respectively 0.5, 0.5, and 0.8, the location relationship between the antenna 1 and the antenna 2 is “far away”, a location relationship between the antenna 1 and an antenna 3 is “far away”, and a location relationship between the antenna 2 and the antenna 3 is “close”. For example, for the location relationship between the antennas 1 to 3, refer to content shown in (b) in FIG. 6. In this case, the electronic device 100 determines that the antenna 1 is far away from other antennas, and may determine, according to the power adjustment method, that a final transmit power of the antenna 1 is the reference transmit power $P_R$, namely, 120 mW. The electronic device 100 may preset a permissive total exposure ratio. For example, when the permissive total exposure ratio TER of the electronic device 100 is 0.8, and the location relationship between the antenna 2 and the antenna 3 is “close”, after the electronic device 100 adjusts the exposure ratios ER' of the antenna 2 and the antenna 3 to 0.4 and 0.4 respectively according to the exposure ratio allocation method of evenly allocating an exposure ratio, the electronic device 100 calculates, according to Formula 5, that a final transmit power of the antenna 2 is 0.4/0.5×140=112 mW, and a final transmit power of the antenna 3 is 0.4/0.8×160=80 mW.

In some embodiments, the electronic device 100 may use the transmit power P as a maximum transmit power of a corresponding antenna. In this way, an actual transmit power of the electronic device 100 is less than the transmit power P, so that user safety is ensured and communication performance of each antenna in the multi-antenna transmission scenario is improved.

In some other embodiments, the electronic device 100 may use the transmit power P as a maximum average transmit power of a corresponding antenna. In this way, an instantaneous value of an actual transmit power of the electronic device 100 may be greater than the transmit power P, but an average transmit power in a period of time is less than or equal to the transmit power P. Specifically, the electronic device 100 may adjust the transmit power of the antenna according to a time average algorithm, so that, in a process in which the electronic device 100 actually transmits a signal, an average value of actual transmit powers of the antenna is less than or equal to the transmit power P. In this way, the electronic device 100 may dynamically adjust the transmit power based on an actual case. For example, when a signal of the antenna is weak at a moment due to blocking of a user hand, the electronic device 100 may increase the transmit power of the antenna in the time period, to ensure communication quality of the electronic device 100 as much as possible. Then, the electronic device 100 decreases the transmit power at another moment. In this way, in a period of time, a case in which radiation of the electronic device 100 exceeds a standard value does not occur, and user safety is still ensured.

It may be understood that any two of the single-antenna power configuration table, the limit transmit power configuration table, and the reference exposure ratio configuration table may be configured for the electronic device 100. When the electronic device 100 needs to use a parameter (for example, the reference transmit power $P_R$, the limit transmit power $P_L$, or the reference exposure ratio ER) of the antenna, the electronic device 100 can obtain the parameter from the stored configuration table, or obtain the parameter through calculation based on the two stored configuration tables. The electronic device 100 may store the configuration table in the internal memory 121 (for example, the NVM) of the electronic device 100.

In some embodiments, the electronic device 100 may integrate two configured configuration tables into one configuration table. For example, when the electronic device 100 is configured with the single-antenna power configuration table and the reference exposure ratio configuration table, the single-antenna power configuration table and the reference exposure ratio configuration table may be integrated into one configuration table, and the configuration table may include the reference transmit power $P_R$ and the reference exposure ratio ER of the antenna. Table 6 shows an example of some content of the configuration table.

TABLE 6

| | Antenna 1 | | Antenna 2 | | . . . | Antenna N | |
|---|---|---|---|---|---|---|---|
| Scenario 1 | $P_R11$ | Ratio11 | $P_R12$ | Ratio12 | . . . | $P_R1N$ | Ratio1N |
| Scenario 2 | $P_R21$ | Ratio21 | $P_R22$ | Ratio22 | . . . | $P_R2N$ | Ratio2N |
| . . . | . . . | . . . | . . . | . . . | . . . | . . . | . . . |
| Scenario M | $P_RM1$ | RatioM1 | $P_RM2$ | RatioM2 | . . . | $P_RMN$ | RatioMN |

Herein, $P_RXY$ (X=1, 2, . . . , M, Y=1, 2, . . . , N) is a reference transmit power $P_R$ of an antenna X in a scenario Y, and RatioXY (X=1, 2, . . . , M, Y=1, 2, . . . , N) is a reference exposure ratio ER of the antenna X in the scenario Y.

Figure 10:
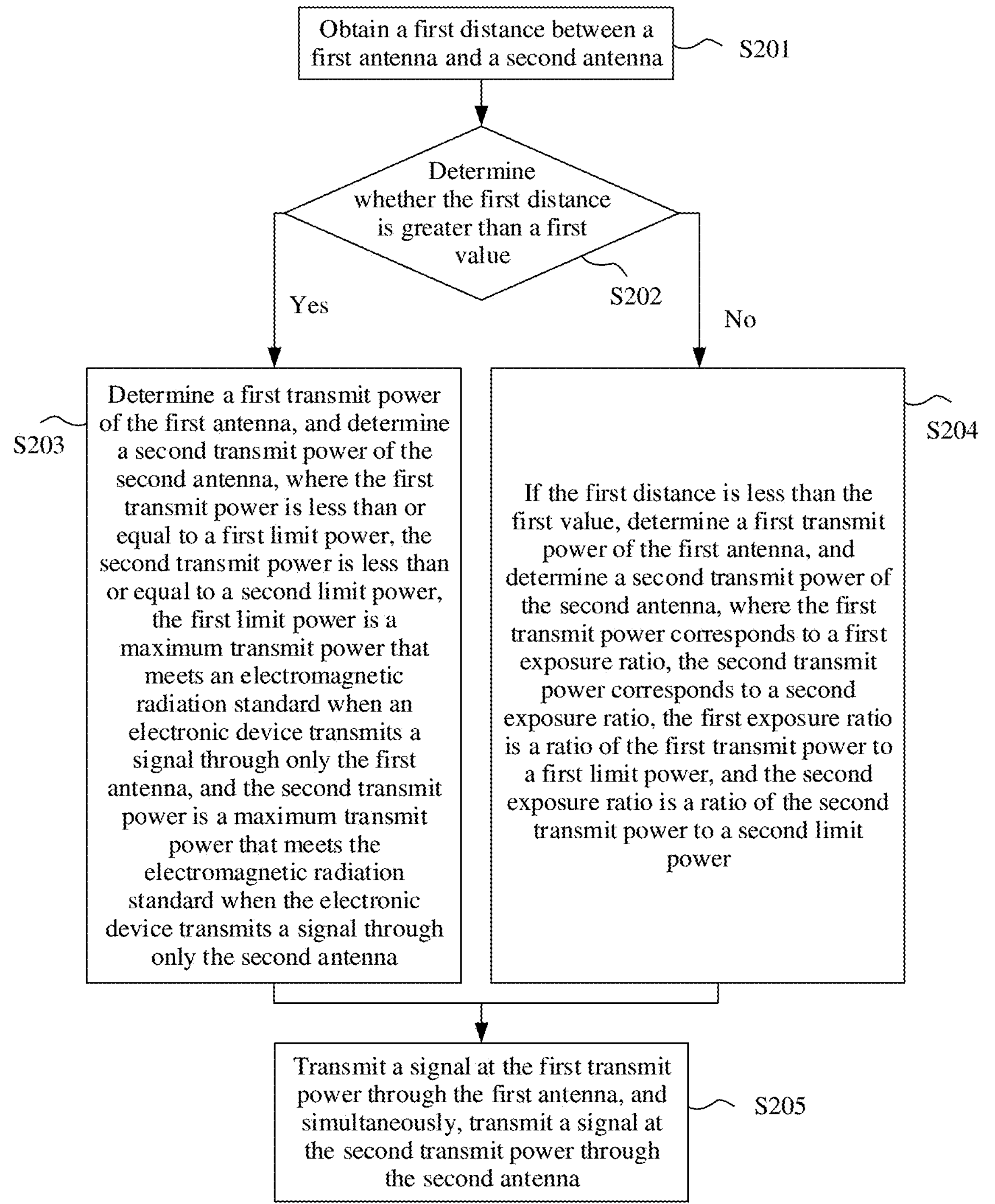
FIG. 10 is a method flowchart of a transmit power adjustment method according to an embodiment of this application.

FIG. 10 is a schematic flowchart of a transmit power adjustment method in a dual-antenna transmission scenario according to an embodiment of this application.

S201: Obtain a first distance between a first antenna and a second antenna.

For example, as shown in (b) in FIG. 6, the first antenna and the second antenna may be any two of the antenna 1, the antenna 2, and the antenna 3 in the electronic device 100. The first distance is a distance between the first antenna and the second antenna.

In some embodiments, the electronic device 100 may pre-store an antenna location relationship table, and the antenna location relationship table is for determining the distance between the first antenna and the second antenna. Specifically, the electronic device 100 can obtain the first distance between the first antenna and the second antenna based on the antenna location relationship table. For specific descriptions of the antenna location relationship table, refer to Table 5 and related content of Table 5.

S202: Determine whether the first distance is greater than a first value.

The first value is a predetermined value. When the first distance is greater than the first value, the electronic device 100 may determine that the distance relationship between the first antenna and the second antenna is far away or relatively far away. In this case, a superposition effect of radiation of the first antenna and the second antenna is weak. When the first distance is less than the first value, the electronic device 100 may determine that the distance relationship between the first antenna and the second antenna is close or relatively close. In this case, a superposition effect of radiation of the first antenna and the second antenna is strong.

When the electronic device 100 determines that the first distance is greater than the first value, the electronic device 100 performs step S203; otherwise, the electronic device 100 performs step S204.

S203: If the first distance is greater than the first value, determine a first transmit power of the first antenna, and determine a second transmit power of the second antenna, where the first transmit power is less than or equal to a first limit power, the second transmit power is less than or equal to a second limit power, the first limit power is a maximum transmit power that meets an electromagnetic radiation standard when the electronic device transmits a signal through only the first antenna, and the second transmit power is a maximum transmit power that meets the electromagnetic radiation standard when the electronic device transmits a signal through only the second antenna.

The first limit power is a limit transmit power $P_L$ of the first antenna, and the second limit power is a limit transmit power $P_L$ of the second antenna.

In some embodiments, the electronic device 100 may store a first configuration table. The first configuration table includes the first transmit power and the second transmit power. The electronic device 100 may determine the first transmit power of the first antenna and the second transmit power of the second antenna based on the first configuration table.

The first configuration table may be a single-antenna power configuration table, and the first transmit power and the second transmit power are respectively reference transmit powers $P_R$ of the first antenna and the second antenna. For specific descriptions of the single-antenna configuration table, refer to Table 2 and related content of Table 2.

The first configuration table may be a limit transmit power configuration table, and the first transmit power and the second transmit power are respectively limit transmit powers $P_L$ of the first antenna and the second antenna. For specific descriptions of the limit transmit power configuration table, refer to Table 3 and related content of Table 3.

In other words, when the distance between the first antenna and the second antenna is long, the electronic device 100 may adjust the transmit powers of the first antenna and the second antenna based on pre-stored power values of the electronic device 100.

In some other embodiments, the electronic device 100 may store a second configuration table. The second configuration table includes a first reference exposure ratio and a second reference exposure ratio. The electronic device 100 may determine the first transmit power of the first antenna based on the first reference exposure ratio, and determine the second transmit power of the second antenna based on the second reference exposure ratio. The first transmit power is a product of the first limit power and the first reference exposure ratio, and the second transmit power is a product of the second limit power and the second reference exposure ratio.

The second configuration table may be a reference exposure ratio configuration table. The electronic device 100 may obtain the transmit powers of the first antenna and the second antenna through calculation based on a reference exposure ratio stored in the reference exposure ratio configuration table. The reference exposure ratio is in direct proportion to the transmit power of the antenna. For specific descriptions of the reference exposure ratio configuration table, refer to Table 4 and related content of Table 4.

In other words, when the distance between the first antenna and the second antenna is long, the electronic device 100 may obtain the transmit powers of the first antenna and the second antenna through calculation based on the pre-stored exposure ratios of the antennas.

In some other embodiments, when the electronic device 100 pre-stores the transmit power and the exposure ratio of the antenna, the electronic device 100 may alternatively adjust the exposure ratio of the first antenna and the exposure ratio of the second antenna according to an exposure ratio allocation method, and then calculate an adjusted transmit power of the antenna based on a direct proportion relationship between the exposure ratio and the transmit power. The exposure ratio allocation method includes but is not limited to even allocation, preferential allocation, allocation based on a service type, allocation based on signal strength, allocation based on a ratio of exposure ratios, or the like.

In other words, when the distance between the first antenna and the second antenna is long, the electronic device 100 may not transmit a signal at a pre-stored power value, but readjust the transmit power of the antenna, so that the antenna can dynamically adjust the transmit power based on an actual case, for example, adjust the transmit power based on signal strength or a service type.

S204: If the first distance is less than the first value, determine a first transmit power of the first antenna, and determine a second transmit power of the second antenna, where the first transmit power corresponds to a first exposure ratio, the second transmit power corresponds to a second exposure ratio, the first exposure ratio is a ratio of the first transmit power to a first limit power, the second exposure ratio is a ratio of the second transmit power to a second limit power, and a sum of the first exposure ratio and the second exposure ratio is less than or equal to 1.

Specifically, the electronic device 100 may determine the first exposure ratio and the second exposure ratio according to an exposure ratio allocation method, where the exposure ratio allocation method includes one or more of the following: even allocation, preferential allocation, allocation based on a service type, allocation based on signal strength, allocation based on a ratio of exposure ratios, or the like. In addition, the electronic device 100 may preset a total exposure ratio of the first antenna and the second antenna. The total exposure ratio is the sum of the first exposure ratio and the second exposure ratio.

In some embodiments, the electronic device 100 may determine a first reference exposure ratio and a second reference exposure ratio based on a pre-stored configuration table. The first reference exposure ratio is a ratio of a first reference power to the first limit power, and the second reference exposure ratio is a ratio of a second reference power to the second limit power. If a sum of the first reference exposure ratio and the second reference exposure ratio is less than or equal to 1, the electronic device 100 can determine the first reference power as the first transmit power, and determine the second reference power as the second transmit power.

The electronic device 100 may pre-store a single-antenna configuration table and a limit transmit power configuration table. In this way, the electronic device 100 can obtain the first reference power and the second reference power from the single-antenna configuration table, and obtain the first limit power and the second limit power from the limit transmit power configuration table. In this case, the electronic device 100 can determine the first reference exposure ratio based on the ratio of the first reference power to the first limit power, and determine the second reference exposure ratio based on the ratio of the second reference power to the second limit power.

Alternatively, the electronic device 100 may pre-store a single-antenna configuration table and a reference exposure ratio configuration table. In this way, the electronic device 100 obtains the first reference power and the second reference power from the single-antenna configuration table, and obtains the first reference exposure ratio and the second reference exposure ratio from the reference exposure ratio configuration table.

Alternatively, the electronic device 100 may pre-store a limit transmit power configuration table and a reference exposure ratio configuration table. In this way, the electronic device 100 obtains the first limit power and the second limit power from the limit transmit power configuration table, and obtains the first reference exposure ratio and the second reference exposure ratio from the reference exposure ratio configuration table. In this case, the electronic device 100 can determine the first reference power based on a product of the first limit power and the first reference exposure ratio, and determine the second reference power based on a product of the second limit power and the second reference exposure ratio.

S205: The first antenna transmits the signal at the first transmit power, and the second antenna transmits the signal at the second transmit power.

In some embodiments, when the electronic device 100 transmits the signal through the first antenna and the second antenna, the transmit power of the first antenna may be less than or equal to the first transmit power, or an average transmit power of the first antenna within a first time period is less than or equal to the first transmit power. The first time period is less than or equal to a time period specified in the electromagnetic radiation standard. In addition, the transmit power of the second antenna may also be less than or equal to the second transmit power, or an average transmit power of the second antenna within the first time period is less than or equal to the second transmit power. The first time period is less than or equal to the time period specified in the electromagnetic radiation standard.

In other words, actual transmit powers of the first antenna and/or an actual transmit power of the second antenna may not exceed the first transmit power and the second transmit power that are determined by the electronic device 100, respectively, or average transmit powers of the first antenna and/or the second antenna in a period of time may not exceed the first transmit power and the second transmit power that are determined by the electronic device 100, respectively. In other words, the first transmit power and the second transmit power may be maximum transmit powers of the antennas determined by the electronic device 100, or may be maximum average transmit powers of the antennas determined by the electronic device 100.

When the electronic device 100 determines that the first transmit power and the second transmit power are the maximum average transmit powers, the electronic device 100 can make, by using a time average algorithm, an average value of transmit powers of the first antenna in a period of time not exceed the first transmit power, and an average value of transmit powers of the second antenna in the period of time not exceed the second transmit power.

Figure 11:
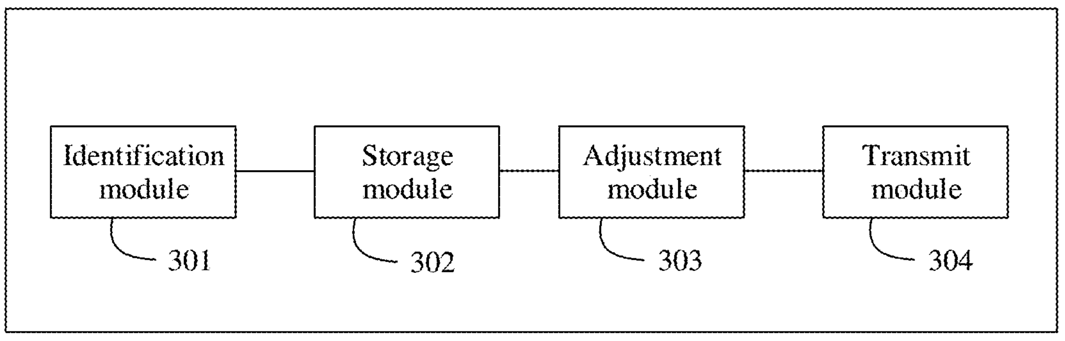
FIG. 11 is a schematic diagram of a structure of a transmit power adjustment apparatus according to an embodiment of this application.

With reference to FIG. 11, the following describes a schematic diagram of a structure of a transmit power adjustment apparatus according to an embodiment of this application.

As shown in FIG. 11, the transmit power adjustment apparatus may include an identification module 301, a storage module 302, an adjustment module 303, and a transmit module 304.

The identification module 301 may be configured to obtain a distance between antennas in a multi-antenna transmission scenario. In addition, before obtaining the distance between the antennas, the identification module 301 is further configured to identify whether the electronic device 100 is in the multi-antenna transmission scenario, namely, whether the electronic device 100 transmits signals through a plurality of antennas, or is about to transmit signals through a plurality of antennas within a first time period. When determining that the electronic device 100 is in the multi-antenna transmission scenario, the identification module 301 obtains the distance between the antennas from the storage module 302 based on antennas that need to transmit signals or are transmitting signals.

The storage module 302 stores an antenna location relationship table, and any two of a single-antenna power configuration table, a reference exposure ratio configuration table, and a limit transmit power configuration table. In addition, the storage module 302 may further store a total exposure ratio, and the electronic device 100 may adjust an exposure ratio of each antenna based on the total exposure ratio, to calculate a transmit power of each antenna. The storage module 302 can obtain, based on indication information of the antennas sent by the identification module 301, reference transmit powers $P_R$, reference exposure ratios ER, and a location relationship of the antennas from any two of the antenna location relationship table, the single-antenna power configuration table, the reference exposure ratio configuration table, and the limit transmit power configuration table, and send the obtained reference transmit powers $P_R$, reference exposure ratios ER, and location relationship of the antennas to the adjustment module 303.

The adjustment module 303 can determine, based on the location relationship of the antennas and the reference exposure ratio ER of the antenna, whether the electronic device 100 needs to adjust the exposure ratio of the antenna. Specifically, when a single antenna is away from another antenna, the electronic device 100 may adjust a transmit power according to a power adjustment method, for example, adjust the transmit power of the antenna to the reference transmit power $P_R$. When there are a plurality of antennas that are close to each other, the electronic device 100 may determine, based on whether a total reference exposure TER of these antennas is less than 1, whether to adjust exposure ratios of the antennas. When the TER≤1, the electronic device 100 may adjust a transmit power according to a power adjustment method, for example, adjust the transmit power of the antenna to the reference transmit power $P_R$. When the TER>1, the electronic device 100 adjusts exposure ratios of the plurality of antennas according to an exposure ratio allocation method, and calculates the transmit power of the antenna based on an adjusted exposure ratio. Then, the electronic device 100 sends the determined transmit power of the antenna to the transmit module 304.

The transmit module 304 may be configured to transmit the signal at the finally determined transmit power of each antenna, or the transmit module 204 transmits the signal according to a time average algorithm by using the finally determined transmit power of each antenna as an average transmit power, to ensure that an average value of actual transmit powers is less than or equal to the transmit power in a period of time.

The implementations of this application may be randomly combined, to achieve different technical effects.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. An electronic device, comprising:

a first antenna;

a second antenna;

at least one processor; and at least one non-transitory computer readable memory connected to the at least one processor and including computer program code comprising a plurality of applications and one or more programs, wherein the at least one non-transitory computer readable memory and the computer program code executable by the at least one processor are configured to cause the electronic device to perform at least:

obtaining, by the electronic device, a first distance between the first antenna and the second antenna;

determining, by the electronic device, whether the first distance is greater than a first value;

determining, by the electronic device, a first transmit power of the first antenna, and determining a second transmit power of the second antenna, wherein, when the first distance is greater than the first value, the first transmit power is less than or equal to a first limit power, and the second transmit power is less than or equal to a second limit power, the first limit power is a maximum transmit power that meets an electromagnetic radiation standard when the electronic device transmits a signal through only the first antenna, and the second limit power is a maximum transmit power that meets the electromagnetic radiation standard when the electronic device transmits a signal through only the second antenna, or wherein, when the first distance is less than the first value, a sum of a first exposure ratio corresponding to the first transmit power and a second exposure ratio corresponding to the second transmit power is less than or equal to 1, the first exposure ratio is a ratio of the first transmit power to the first limit power, and the second exposure ratio is a ratio of the second transmit power to the second limit power; and transmitting, by the electronic device, a signal at the first transmit power through the first antenna, and simultaneously transmitting, by the electronic device, a signal at the second transmit power through the second antenna.

2. The electronic device of claim 1, wherein an average transmit power of the first antenna within a first time period is less than or equal to the first transmit power, and the first time period is less than or equal to a time period specified in the electromagnetic radiation standard.

3. The electronic device of claim 1, wherein an average transmit power of the second antenna within a first time period is less than or equal to the second transmit power, and the first time period is less than or equal to a time period specified in the electromagnetic radiation standard.

4. The electronic device of claim 1, wherein the electronic device stores a first configuration table, the first configuration table comprises the first transmit power and the second transmit power;

wherein the first distance is greater than the first value; and wherein determining the first transmit power of the first antenna, and determining the second transmit power of the second antenna, comprise determining, by the electronic device based on the first configuration table, the first transmit power of the first antenna, and determining the second transmit power of the second antenna.

5. The electronic device of claim 1, wherein the electronic device stores a second configuration table, wherein the second configuration table comprises a first reference exposure ratio and a second reference exposure ratio;

wherein the first distance is greater than the first value; and wherein determining the first transmit power of the first antenna, and determining the second transmit power of the second antenna, comprise determining, by the electronic device, the first transmit power of the first antenna based on the first reference exposure ratio, and determining the second transmit power of the second antenna based on the second reference exposure ratio, wherein the first transmit power is a product of the first limit power and the first reference exposure ratio, and wherein the second transmit power is a product of the second limit power and the second reference exposure ratio.

6. The electronic device of claim 1, wherein the first distance is less than the first value; and wherein determining the first transmit power of the first antenna, and determining the second transmit power of the second antenna, comprise:

determining, by the electronic device, the first exposure ratio and the second exposure ratio according to an exposure ratio allocation method, wherein the exposure ratio allocation method comprises one or more of even allocation, preferential allocation, allocation based on a service type, allocation based on signal strength, or allocation based on a ratio of exposure ratios; and determining, by the electronic device, the first transmit power of the first antenna based on the first exposure ratio, and determining the second transmit power of the second antenna based on the second exposure ratio.

7. The electronic device of claim 6, wherein the electronic device presets a total exposure ratio of the first antenna and the second antenna, and wherein the total exposure ratio is a sum of the first exposure ratio and the second exposure ratio.

8. The electronic device of claim 1, wherein the first distance is less than the first value; and wherein determining the first transmit power of the first antenna, and determining the second transmit power of the second antenna, comprise:

obtaining, by the electronic device, a first reference exposure ratio and a second reference exposure ratio, wherein the first reference exposure ratio is a ratio of a first reference power to the first limit power, and the second reference exposure ratio is a ratio of a second reference power to the second limit power wherein the first reference power is less than or equal to the first limit power, and wherein the second reference power is less than or equal to the second limit power; and performing, in response to a sum of the first reference exposure ratio and the second reference exposure ratio being less than or equal to 1, determining, by the electronic device, the first reference power as the first transmit power, and determining, by the electronic device, the second reference power as the second transmit power.

9. The electronic device of claim 8, wherein:

the electronic device stores the first reference power, the second reference power, the first reference exposure ratio, and the second reference exposure ratio; or the electronic device stores the first reference power, the second reference power, the first limit power, and the second limit power; or the electronic device stores the first reference exposure ratio, the second reference exposure ratio, the first limit power, and the second limit power.

10. The electronic device of claim 1, wherein the electronic device pre-stores an antenna location relationship table, and wherein the antenna location relationship table is associated with determining a distance between the first antenna and the second antenna; and wherein the obtaining the first distance between the first antenna and the second antenna comprises:

obtaining, by the electronic device, the first distance between the first antenna and the second antenna based on the antenna location relationship table.

11. A non-transitory computer-readable storage medium storing computer program code, wherein the computer program code, when executed by at least one processor of an electronic device causes the electronic device to perform at least:

obtaining, by the electronic device, a first distance between a first antenna and a second antenna;

determining, by the electronic device, whether the first distance is greater than a first value;

determining, by the electronic device, a first transmit power of the first antenna, and determining a second transmit power of the second antenna, wherein, when the first distance is greater than the first value, the first transmit power is less than or equal to a first limit power, and the second transmit power is less than or equal to a second limit power, the first limit power is a maximum transmit power that meets an electromagnetic radiation standard when the electronic device transmits a signal through only the first antenna; and the second limit power is a maximum transmit power that meets the electromagnetic radiation standard when the electronic device transmits a signal through only the second antenna or wherein, when the first distance is less than the first value, a sum of a first exposure ratio corresponding to the first transmit power and a second exposure ratio corresponding to the second transmit power is less than or equal to 1, the first exposure ratio is a ratio of the first transmit power to the first limit power, and the second exposure ratio is a ratio of the second transmit power to the second limit power; and transmitting, by the electronic device, a signal at the first transmit power through the first antenna, and simultaneously transmitting, by the electronic device, a signal at the second transmit power through the second antenna.

12. The non-transitory computer-readable storage medium of claim 11, wherein an average transmit power of the first antenna within a first time period is less than or equal to the first transmit power, and the first time period is less than or equal to a time period specified in the electromagnetic radiation standard.

13. The non-transitory computer-readable storage medium of claim 11, wherein an average transmit power of the second antenna within a first time period is less than or equal to the second transmit power, and the first time period is less than or equal to a time period specified in the electromagnetic radiation standard.

14. The non-transitory computer-readable storage medium of claim 11, wherein the electronic device stores a first configuration table, wherein the first configuration table comprises the first transmit power and the second transmit power, wherein the first distance is greater than the first value; and wherein determining the first transmit power of the first antenna, and determining the second transmit power of the second antenna, comprise determining, by the electronic device based on the first configuration table, the first transmit power of the first antenna, and determining the second transmit power of the second antenna.

15. The non-transitory computer-readable storage medium of claim 11, wherein the electronic device stores a second configuration table, wherein the second configuration table comprises a first reference exposure ratio and a second reference exposure ratio, wherein the first distance is greater than the first value; and wherein determining, by the electronic device, a first transmit power of the first antenna, and determining a second transmit power of the second antenna, comprise determining, by the electronic device, the first transmit power of the first antenna based on the first reference exposure ratio, and determining the second transmit power of the second antenna based on the second reference exposure ratio, wherein the first transmit power is a product of the first limit power and the first reference exposure ratio, and wherein the second transmit power is a product of the second limit power and the second reference exposure ratio.

16. The non-transitory computer-readable storage medium of claim 11, wherein the first distance is less than the first value; and wherein determining, by the electronic device, a first transmit power of the first antenna, and determining a second transmit power of the second antenna comprise:

determining, by the electronic device, the first exposure ratio and the second exposure ratio according to an exposure ratio allocation method, wherein the exposure ratio allocation method comprises one or more of even allocation, preferential allocation, allocation based on a service type, allocation based on signal strength, or allocation based on a ratio of exposure ratios; and determining, by the electronic device, the first transmit power of the first antenna based on the first exposure ratio, and determining the second transmit power of the second antenna based on the second exposure ratio.

17. The non-transitory computer-readable storage medium of claim 16, wherein the electronic device presets a total exposure ratio of the first antenna and the second antenna, and wherein the total exposure ratio is a sum of the first exposure ratio and the second exposure ratio.

18. The non-transitory computer-readable storage medium of claim 11, wherein the first distance is less than the first value; and wherein determining, by the electronic device, a first transmit power of the first antenna, and determining a second transmit power of the second antenna comprise:

obtaining, by the electronic device, a first reference exposure ratio and a second reference exposure ratio, wherein the first reference exposure ratio is a ratio of a first reference power to the first limit power, and the second reference exposure ratio is a ratio of a second reference power to the second limit power; and the first reference power is less than or equal to the first limit power, and the second reference power is less than or equal to the second limit power; and performing, in response to a sum of the first reference exposure ratio and the second reference exposure ratio being less than or equal to 1, determining, by the electronic device, the first reference power as the first transmit power, and determining, by the electronic device, the second reference power as the second transmit power.

19. The non-transitory computer-readable storage medium of claim 18, wherein:

the electronic device stores the first reference power, the second reference power, the first reference exposure ratio, and the second reference exposure ratio; or the electronic device stores the first reference power, the second reference power, the first limit power, and the second limit power; or the electronic device stores the first reference exposure ratio, the second reference exposure ratio, the first limit power, and the second limit power.

20. The non-transitory computer-readable storage medium of claim 11, wherein the electronic device prestores an antenna location relationship table, and wherein the antenna location relationship table is for determining a distance between the first antenna and the second antenna; and wherein obtaining the first distance between the first antenna and the second antenna comprises obtaining, by the electronic device, the first distance between the first antenna and the second antenna based on the antenna location relationship table.

* * * * *